United States Patent [19]
Horiguchi et al.

[11] 3,897,450
[45] July 29, 1975

[54] METAL PHTHALOCYANINE TYPE PIGMENT

[75] Inventors: Shojiro Horiguchi; Yoshio Abe; Tohoru Hosoda, all of Tokyo, Japan

[73] Assignee: Dainichiseika Color & Chemicals Mfg. Co. Ltd., Tokyo, Japan

[22] Filed: Feb. 10, 1970

[21] Appl. No.: 10,204

[52] U.S. Cl. ........ 260/314.5; 260/270 R; 260/270 P
[51] Int. Cl. ........................................... C09b 47/04
[58] Field of Search ................................. 260/314.5

[56] References Cited
UNITED STATES PATENTS

| | | | |
|---|---|---|---|
| 2,138,413 | 11/1938 | Turek | 260/314.5 |
| 2,681,348 | 6/1954 | Brooks | 260/314.5 |
| 2,683,643 | 7/1954 | Baumann et al. | 260/314.5 |
| 3,412,102 | 11/1968 | Schulz et al. | 260/314.5 |

FOREIGN PATENTS OR APPLICATIONS

| | | | |
|---|---|---|---|
| 538,957 | 8/1941 | United Kingdom | 260/314.5 |

OTHER PUBLICATIONS

JACS 74: 2808, 2809, 1952, Ebert et al..
Phthalocyanine Compounds, Moser et al., page 110, (1963), Reinhold Pub. Corp., N.Y.
Moser, Phthalocyanine, (pds., p. 343–344) (1963) (NPIRI Test Procedure).
Fieser et al., Organic Chemistry, p. 126, (1950).

*Primary Examiner*—Harry I. Moatz
*Attorney, Agent, or Firm*—Fred Philpitt

[57] ABSTRACT

Method for producing a metal phthalocyanine type pigment which comprises subjecting an O-dinitrile type compound and a metallic substance capable of forming a central nucleus of the phthalocyanine type pigment to condensation reaction at a low temperature in the presence of an alkaline substance selected from the group consisting of hydroxide, oxide, peroxide and carbonate of alkali metal and of alkaline earth metal and a hydrophilic organic solvent having hydroxyl radical. By this method, products having clear color tone, fine crystal state, large coloring power, soft texture and superior resistance to heat can be obtained easily with a high yield without the necessity of after treatment of pigmentation.

17 Claims, 1 Drawing Figure

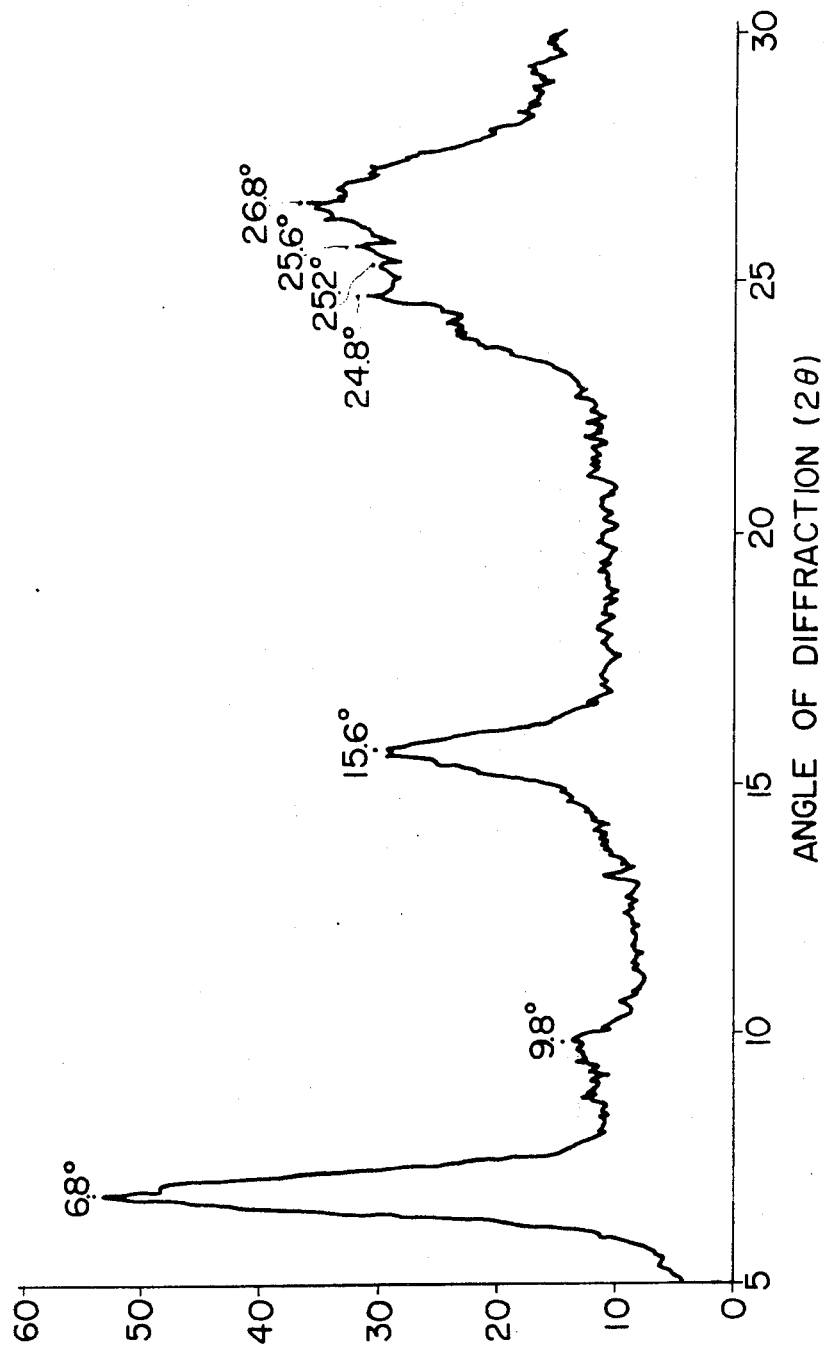

METAL PHTHALOCYANINE TYPE PIGMENT

FIELD OF THE INVENTION

This invention relates to a novel method for producing metal phthalocyanine type pigments, metal phthalocyanine pigments so produced and a copper phthalocyanine pigment having a novel crystal form.

BACKGROUND OF THE INVENTION

Heretofore, among phthalocyanine type pigments, metal phthalocyanine type and metal halogeno-substituted phthalocyanine type pigments including copper phthalocyanine as a most useful principal member have been known. These pigments have blue to green hues and since their fastness to light, resistances to heat, various chemicals and the like are superior, they are evaluated highly as coloring agents for various articles. For example, they are enjoying their wide variety of application field as coloring agents for printing ink, paint, synthetic resin, woven fabrics, stationeries, etc., and their demand is showing a steady increase year after year.

Metal phthalocyanine type pigments among phthalocyanine type pigments having such superior properties and useful in wide variety of application field, are produced by following methods.

1. A so-called urea method which comprises subjecting a mixture of phthalic anhydride, phthalimide, or derivatives thereof, a metal capable of forming a central nucleus of phthalocyanine type pigments or a compound of such a metal, urea and a catalyser such as boric acid, $AS_2O_5$, $3(NH_4)_2O.7MoO_3.4H_2O$ or the like to condensation reaction at 200° ~ 300° C.

2. A so-called phthalodinitrile method which comprises subjecting a mixture of phthalodinitrile or its derivatives, and a metal capable of forming a central nucleus of phthalocyanine type pigments or a compound of such a metal at a high temperature of 180° ~ 300° C.

Since the metal phthalocyanine type pigments produced by a method such as those above-mentioned are hard blocks of large coarse particles, their color tone is not clear, they are poor in coloring power an hence can hardly be employed in the practical use as pigments.

In order to give pigmental aptitude such as coloring power, clearness, etc. to metal phthalocyanine type pigments produced according to the above-mentioned method and make them useful as pigments, a processing step for pigmentation such as a so-called acid paste or acid slurry method which comprises dissolving the crude product just after production according to the above-mentioned method in an acid such as concentrated or fuming sulfuric acid or wetting the former with the latter and then pouring the solution or slurry into a large amount of water to reprecipitate it into fine state or a method which comprises adding mechanical shock to crude products of metal phthalocyanine type pigment to pulverize them, has been indispensable in the production.

In cases of the acid slurry method or the acid paste method, there are accompanied extreme drawbacks when it is used actually in commerce because a large amount of acid must be used to dissolve or wet resultant crude products or removal or disposal of acids from the pigments after reprecipitation in water, corrosion of apparatus must be considered.

In cases of the method which utilizes mechanical shock as in ball-milling method, operation is so complicated, requires such a long time and a large amount of power and the processing amount per lot is so small that it is considered extremely inefficient, nonproductive and disadvantageous for a large scale commercial production.

Further, common metal phthalocyanine type pigments, one pulverized, tend to cause recohesion in the subsequent step to form very hard, hard-to-crush secondary and tertiary particles. On this account, a great deal of mechanical energy is required to disperse them in fine and uniform state and even with the expense of such a great deal of mechanical energy it is almost impossible to put them back to the state of primary particle fresh from production. Thus relatively coarse particles become the cause of poor dispersion, reduction of coloring power, dullness of tone and further bad influences given upon various properties of to-be-colored materials.

Metal phthalocyanine type pigments appear in various kinds of crystallographical forms, showing polymorphism. With regard to copper phthalocyanine pigments, 4 crystal forms $\alpha$-type (stable), $\beta$-type (unstable), $\gamma$-type (unstable) and $\delta$-type (unstable) are known.

With regard to cobalt and nickel phthalocyanine also, there are known $\alpha$-, $\beta$-, and $\gamma$-types. These crystallographically different types have their own characteristic properties. In case of copper phthalocyanine, $\alpha$-type (stable) is stable against organic solvents particularly against aromatic solvents but three kinds of $\beta$-type (unstable), $\gamma$-type and $\delta$-type are unstable crystals and turned to $\alpha$-type by crystallographical transformation in an aromatic solvent. As for hue, $\alpha$-type is blue with the strongest yellow tint but $\beta$-, $\gamma$- and $\delta$-types are of redish blue. These 4 kinds of crystal forms have crystallographically their own characteristic properties but at present the pigments having $\alpha$- and $\beta$-types are being used widely in commerce. On account of the above-mentioned property, $\beta$-type, compared with $\alpha$-type, is not suitable for the use in a vehicle containing an aromatic solvent.

As for the production method of copper phthalocyanine pigments having an $\alpha$-type (stable) crystallographic form, there have been known heretofore various methods. For example they can be obtained by pigmentation processing such as a method in which the crude copper phthalocyanine pigment obtained by the abovementioned urea method or phthalodinitrile method is pulverized by applying mechanical shock (e.g. ball-milling in a small amount of an organic solvent).

However, in this method, operation is so complicated, requires a long-time and a large amount of power and the processing amount per lot is small; hence this method is extremely disadvantageous for a large scale commercial production.

The pigment obtained by this method is of extremely hard and difficult-to-crush particle and requires a great deal of mechanical energy for dispersing finely in a vehicle. In addition, it is almost impossible to put it back to original primary particle as produced. On this account, it is often accompanied with the cause of bad influence upon various properties of to-be-colored substances such as poor dispersion, reduction of coloring power, and dullness of tone.

For producing copper phthalocyanine pigments having β-type (unstable) crystallographic form, a method in which the crude copper phthalocyanine pigment is dissolved in or wetted with an acid such as sulfuric acid and then poured into a large amount of water to be reprecipitated (acid paste method or acid slurry method), is used to obtain pigments having a practical value by pigmentation.

This pigmentation processing e.g. the above-mentioned acid paste method uses a large amount of acid (e.g. 10 to 20 times the amount of crude pigment); hence when it is used commercially, the problem of corrosion of reaction apparatus, treatment of spent liquor, water washing carried out for a long period of time to remove acid from resultant pigments have been serious drawbacks.

For producing a copper phthalocyanine having a γ-type (unstable) crystallographic form, the crude copper phthalocyanine is further mixed with 98% by weight of sulfuric acid, diluted to 65% by weight of sulfuric acid by the addition of water and then poured into a large amount of water to obtain pigments by reprecipitation. However, this pigmentation processing utilizes a large amount of acid and in addition, control of hue is extremely difficult and only products of low coloring power and unclean hue are obtained. Hence the application field of product is limited.

Among phthalocyanine type pigment, metal halogenated phthalocyanine pigments have been produced heretofore by following methods.

1. A method in which a phthalocyanine type pigment is halogenated with a halogen or a halogenating agent in the presence of a solvent such as eutectic mixture of aluminum chloride and sodium chloride, phthalic anhydrite, trichlorobenzene, etc. at a high temperature about 200° C.

2. A method in which a mixture of halogenated phthalic anhydride, halogenated phthalic imide or halogenated phthalodinitrile, a metal or its compound, urea and a small amount of catalyst (e.g. $3(NH_4)_2O.7MoO_3.4H_2O$, $TiCl_4$, $ZrCl_4$, etc.) is heated and reacted at 200° – 300° C.

3. A method in which halogenated phthalodinitrile, and a metal or its compound is heated and reacted at 200° –300° C in an inert highly-boiling aromatic solvent.

Among these conventional methods, the method (1) gives products of clearer hue compared with the methods (2) and (3) but requires an extremely long time for halogenation. Moreover, it has drawbacks such as difficulty of quality control for producing products of constant hue, corrosion of reaction apparatus by a halogenating agent, relatively low reaction yield of halogenated phthalocyanine and necessity of extremely complicated absorption apparatus for unreacted halogenating agent.

Further the methods (2) and (3) have drawbacks in the points that a side-reaction is liable to coccur, and production of products of clear hue is difficult because complete removal of impurities is impossible even when purification is attempted after reaction.

The metal halogenated phthalocyanine type pigments produced according to the above-mentioned conventional methods, are unclear in color tone, poor in coloring power and hardly be used in practical purpose because of being coarse hard particles. Accordingly, as in case of the above-mentioned copper phthalocyanine, a pigmentation processing step such as a method, for example, acid paste method or acid slurry method, in which crude product obtained by one of the above-mentioned method is dissolved in or wetted with an acid such as concentrated sulfuric acid, fuming sulfuric acid or chlorosulfuric acid and then poured into a large amount of water to reprecipitate into finely divided state, has been indispensable in the production.

In the practical application of the above-mentioned pigmentation processing step, a large amount of acid must be used to dissolve or wet resultant crude products and there are further drawbacks in the removal of acid from the pigments after reprecipitation, and corrosion of the apparatus for the disposal of it.

Further, metal halogenated phthalocyanine type pigments, once pulverized, also tend to cause recohesion in the subsequent step to form very hard, hard-to-crush secondary and tertiary particles. On this account, a great deal of mechanical energy is required to disperse them finely and uniformly and even with the expense of such a great deal of mechanical energy, it is almost impossible to put them back to the state of primary particle fresh from production. Thus relatively coarse particles become the cause of poor dispersion, reduction of coloring power, dullness of hue and further bad influences given upon various properties of to-be-colored materials.

Beside the above-mentioned method for producing phthalocyanine type pigments, there is known a method in which 3-iminoisoindolenines having a substituent at the position of 1, is printed or padded on fibers and the resultant fibers are subjected to heat treatment preferably in the presence of a reducing agent to form a phthalocyanine type dye on the fibers but this is not a method for producing a phthalocyanine type pigment itself with a high yield. It is only a method for forming a phthalocyanine type dye on the spots of fibers.

DETAILED DESCRIPTION OF THE INVENTION

An object of the present invention is to provide a method for producing metal phthalocyanine or halogenated phthalocyanine type pigments, having no drawbacks of conventional methods i.e., which method produces products having clear color tone, fine crystalline state, large coloring power, soft texture and superior resistance to heat and does not require the pigmentation processing. Another object of the present invention is to provide a method for producing metal phthalocyanine type pigments, economically by simpler steps compared with the conventional methods. A further object of the present invention is to provide a method for producing arbitrarily α-type (stable type), β-type (unstable type) or γ-type (unstable type) metal phthalocyanine type pigments. A still further object of the present invention is to provide a copper phthalocyanine type pigment having a novel crystal structure.

These objects can be attained by the method of the present invention.

According to the method of the present invention, an O-dinitrile type compound, and a metallic substance of a metal capable of forming a central nucleus of phthalocyanine type pigments, are subjected to condensation reaction in the presence of an alkaline substance selected from the group consisting of hydroxide, oxide, peroxide, carbonate of alkali and alkaline earth metal, at relatively low temperature and in a hydrophilic organic solvent whereby metal phthalocyanine type pigments having clear hue, superior dispersibility, superior heat stability, coloring power, various kinds of fastness and stability to pigment can be obtained in one step.

The term "metallic substance" is used herein to express a metal and a compound of the metal.

In the practice of the present method, various kinds of phthalocyanine type pigments such as α-type (stable) β-type (unstable), γ-type (unstable), etc. can be easily produced by simple processing without resorting to conventional pigmentation processing such as acid slurry method, acid paste method, ball-milling method, etc. Further, since the starting materials of an O-dinitrile type compound and a metal capable of forming a central nucleus of phthalocyanine type pigment are directly reacted at a low temperature in the present method, pigments containing no impurities are obtained in finely divided state.

Since the present method does not require pigmentation processing as required in the conventional methods, operation and apparatus for the production are simpler. Further since the particles of the resultant products are extremely soft, dispersibility is good, and coloring power is large, superior effect are thereby imparted with regard to various fastness of colored products. Thus the present method is a very valuable method in the commercial application because it gives a superior colored product which can be utilized in wide variety of field.

The O-dinitrile type compounds used in the method of the present invention are represented by a general formula

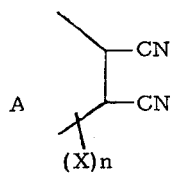

wherein A is aryl or heterocyclic radical, X is hydrogen atom, halogen atom, nitro radical, amino radical, sulfonic acid radical, carboxylic acid radical, alkyl radical, or alkoxyl radical and n is an integer of 1 - 4 and include aromatic dinitrile compounds such as phthalodinitrile, 3,4-dinitrile diphenyl, 1,2-dinitrile naphthalene, 2,3-dinitrile naphthalene, 2,3-dinitrile anthracene, 2,3-dinitrile phenanthrene and the like, halogen substituted dinitrile compounds such as mono-, di-, tri- or tetra-chlorophthalodinitrile, mono-, di-, tri- or tetra-bromophthalodinitrile, mono-, di- tri- or tetra-iodophthalodinitrile and the like, sulfonic acid-substituted phthalodinitrile compounds, carboxylic acid-substituted phthalodinitrile compounds such as carboxylic acid phthalodinitrile and the like, nitro-substituted phthalodinitrile compounds, amino-substituted phthalodinitrile compounds, alkyl-substituted phthalodinitrile compounds such as methyl phthalodinitrile, ethyl phthalodinitrile and the like, alkoxy phthalodinitrile compounds such as methoxy phthalodintrile, ethoxy phthalodinitrile and the like and heterocyclic dinitrile compounds such as 2,3-dinitrile pyridine and the like.

One or more than one above-mentioned o-dinitrile compounds can be used.

Then, in the method of this invention, as metallic materials which form nucleus of phthalocyanine type pigment; for example; copper and copper compounds such as copper powder, cuprous oxide, cupric oxide, cuprous chloride, cupric chloride, cuprous bromide, cupric bromide, copper sulfate, copper nitrate, copper phosphide, copper hydroxide, copper acetate and the like, zinc and zinc compounds such as zinc powder, zinc oxide, zinc chloride, zinc bromide, zinc sulfate, sinc nitrate, zinc carbonate, zinc acetate and the like, tin and tin compounds such as tin powder, tin oxide, tin chloride, tin bromide, tin sulfate, tin nitrate and the like, lead and lead compounds such as lead powder, lead oxide, lead chloride, lead bromide, lead sulfate, lead nitrate, lead acetate and the like, vanadium and vanadium compounds such as vanadium powder, vanadium oxide, vanadium chloride, vanadium bromide, vanadium sulfate and the like, chromium and chromium compounds such as chromium powder, chromium oxide, chromium chloride, chromium sulfate and the like, molybdenum and molybdenum compounds such as molybdenum powder, molybdenum oxide, molybdenum chloride, molybdenum bromide, and the like, manganense and manganese compounds such as manganese powder, manganese oxide, manganese chloride, manganese bromide, manganese sulfate, manganese nitrate, manganese phosphate and the like, iron and iron compounds such as iron powder, ferrous chloride, ferric chloride, ferrous bromide, ferrous phosphate, ferric phosphate, ferrous sulfate, ferric sulfate, ferrous nitrate, ferric nitrate and the like, cobalt and cobalt compounds such as cobalt powder, cobalt oxide, cobalt chloride, cobalt bromide and the like, nickel and nickel compounds such as nickel powder, nickel oxide, nickel chloride, nickel bromide, nickel nitrate, nickel sulphate, nickel phosphide, nickel acetate and the like, palladium and palladium compounds such as palladium powder, palladium oxide, palladium chloride, palladium bromide, palladium sulfate, palladium nitrate and the like and platinum and platinum compounds such as platinum powder, platinum oxide, platinum chloride, platinum bromide can be used.

The quantity of the metallic substance to be used in the present method is preferably in the range of one or more moles per 4 moles of an o-dinitrile type compound stoichiometrically. It is possible to add at this time hydrosulfites, sodium hydrogen sulfate or the like, as an assistant, to clarify further color tone.

Further, in the method of this invention, as alkaline materials which are selected from the group of hydroxides, oxides, peroxides or carbonates of alkali metals and alkaline earth metals, for example; lithium compounds such as lithium oxide, lithium peroxide, lithium hydroxide, lithium carbonate and the like, sodium compounds such as sodium oxide, sodium peroxide, sodium hydroxide, sodium carbonate and the like, potassium compounds such as potassium oxide, potassium peroxide, potassium hydroxide, potassium carbonate and the like, beryllium compounds such as beryllium oxide, beryllium hydroxide and the like, magnesium compounds such as magnesium oxide, magnesium hydroxide and the like, calcium compounds such as calcium oxide, calcium peroxide, calcium hydroxide and the like, strontium compounds such as strontium oxide, strontium peroxide, strontium hydroxide and the like and barium compounds such as barium oxide barium peroxide, barium hydroxide and the like can be used.

The above-mentioned alkaline material is added to keep the reaction system in alkaline state and to advance the reaction smoothly. One or more than one of these compounds can be used in an amount of 2 or less than 2 mols relative to one mol of o-dinitrile type compound.

The amount of alkaline substance to be used differs depending upon the valency of the metal metallic substance capable of forming the central nucleus of phthalocyanine type pigment and the valency of the metal of alkaline substance.

It varies according to whether the valency of the metal of metallic substance and that of alkaline substance are same or not, whether the valency of the metal of metallic substance is divalent or trivalent relative to monovalent alkaline substance and whether the valency of the metal or metallic substance is monovalent or trivalent relative to divalent alkaline substance. More specifically, cases where NaoH are used will be picked up as examples. When the metal of the metallic substance is monovalent, it is preferable to use 0.25 ~ 0.5 mols of NaoH per mol of o-dinitrile type compound, when the metal of the metallic substance is divalent, it is preferable to use 0.5 ~ 0.75 mols of NaoH and when the metal of the metallic substance is trivalent, it is preferable to increase the amount of NaoH relative to o-dinitrile type compound correspondingly.

In the method of this invention it is possible to add to the above-mentioned alkaline material further one or more of amines such as urea, biuret, methyl amine, ethyl amine, propyl amine, diethyl amine, triethyl amine, n-propyl amine, di-n-propylamine, tri-n-propyl amine, n-butyl amine, n-amyl amine, n-hexyl amine, ethanol amine, diethanol amine, triethanol amine, ethylene-diamine, trimethylenediamine, tetramethylenediamine, pentamethylenediamine, hexamethylenediamine, pyridine, aniline or the like, too.

When one of these amines are added products of superior dispersibility or clearer color tone can be obtained.

Further as the hydrophilic organic solvents including hydroxy group in the present method, for example, monohydric or polyhydric hydrophilic alcohols such as methanol, ethanol, propanol, isopropanol, n-butanol, isobutanol, t-butanol, ethylene glycol, propyleneglycol, polyethylene glycol, polypropyleneglycol, or the like, hydrophilic cellosolves such as methyl cellosolve, ethyl cellosolve, diethylene glycol ethyl ether, or the like and hydrophilic phenols such as phenol, O-, m-, p-cresol or the like can be used. These solvents can be used solely or in the form of a solvent mixture.

As for the quantity of these solvents to be used, any quantity will be sufficient so long as the quantity advances the reaction smoothly. Usually 0.5 ~ 15 times the quantity of O-dinitile type compound is used.

In the method of the present invention, it is possible to use a mixture of the above-mentioned hydrophilic organic solvent having a hydroxy radical and another hydrophilic organic solvent, such as hydrophilic amide type solvent e.g. dimethyl formamide, dimethyl acetamide, dimethyl sulfoamide, etc., halogenated fatty hydrocarbon etc., e.g. chloroform, methylene chloride, carbon tetrachloride.

The condensation reaction of the present invention is carried out at a low temperature. The actual temperature varies slightly according to a solvent to be used. It is preferable to be lower than 100° C, and particularly a temperature about 70° C gives superior result. Even at room temperature, it is possible to form metal phthalocyanine type pigments by continuing the reaction for a long time.

In the method of the present invention, it is possible to obtain a pigment having a clear hue and a large coloring power even when the reaction product is filtered, washed with water and dried immediately after the completion of the reaction of an o-dinitrile type compound and a metal substance carried out at a low temperature in the presence of an alkaline substance and in a hydrophilic solvent.

Further the inventors of the present invention have found, after comprehensive. study of the above-mentioned method of the present invention, that the use of an organic or inorganic ammonium salt beside an alkaline substance gives a metal phthalocyanine type pigment of clear hue, fine crystal state, high coloring power and soft texture under the same production condition with the above-mentioned method.

The above-mentioned inorganic and organic ammonium salts include inorganic ammonium salts such as ammonium chloride, ammonium nitrate, ammonium sulfate, ammonium persulfate, ammonium orthophosphate, ammonium metaphosphate, ammonium pyrophosphate, ammonium carbonate, ammonium bicarbonate or the like, and organic ammonium such as ammonium formate, ammonium acetate, ammonium propionate, ammonium citrate, ammonium oxalate or the like.

One or more kinds of these ammonium salts can be used. Although more or less different depending upon the kinds and combination of raw materials, the amount of use is in the range of 0.1 ~ 10% by weight, preferably 0.5 ~ 6% by weight, of the o-dinitrile compounds.

As above-mentioned, the present method relies on a low temperature reaction of o-dinitrile type compound and a metallic substance capable of forming a central nucleus of phthalocyanine type pigment in the presence of a hydrophilic solvent, an alkaline substance and an organic or inorganic ammonium salt for producing a metal phthalocyanine type pigment. After the completion of the reaction, it is possible to obtain a pigment having clear hue and large coloring power even by immediate filtration, water washing and drying.

It is also possible to further treat it with a dilute aqueous acid and/or a dilute aqueous alkali prior to the filtration and drying, if necessary.

The phthalocyanine type pigments thus prepared have a particularly clear hue without necessity of any process of pulverization and pigmentation as in the conventional methods, and also a large coloring power compared with those obtained according to the publicly known methods. Further, as to various properties which have usually been required for the phthalocyanine type pigments, they are provided with the properties which are by no means inferior to the above-mentioned.

In the use of the phthalocyanine type pigments obtained according to the above-mentioned, they can be easily dispersed in a vehicle without necessity of a great mechanical energy or a long time kneading as in the products obtained according to the conventional methods, because the particles are very soft, and further the dispersion ability is excellent. Accordingly, they are available to a wide variety of application fields, and give superior colored products.

Further, in the above-mentioned method, it has been also formed by the present inventors that when an o-dinitrile type compound and a metallic substance capable of forming a central nucleus of a phthalocyanine type pigment are subjected to a condensation reaction at a low temperature, in the presence of an alkaline substance, and in a solvent mixture of a hydrophilic, organic solvent and an aromatic system organic solvent, in place of the hydrophilic, organic solvent alone, metallic phthalocyanine type pigments having crystalline structures of $\alpha$-type (stable type) and $\beta$-type (unstable type) and having a clear hue and a large coloring power, can be easily prepared directly without necessity of customary pigmentation treatment. In such case, it has been also observed that either or both of the $\alpha$-type and $\beta$-type can be arbitrarily prepared by varying the mixing ratio of the hydrophilic, organic solvent to the aromatic system organic solvent. Namely, according to the abovementioned method of the present invention, metallic phthalocyanine type pigments having a desired crystalline structure of $\alpha$-type and $\beta$-type can be obtained by arbitrarily varying the ratio of the amount of the aromatic system organic solvent added to the hydrophilic organic solvent.

In the above-mentioned method of the present invention, it is possible to use, as hydrophobic, aromatic type organic solvents, aromatic hydrocarbons such as benzene, toluene, xylene, naphthalene, biphenyl or the like, chlorinated aromatic hydrocarbons such as monochlorobenzene, dichlorobenzenes, trichlorobenzenes and chloronaphthalenes or the like, or nitrated aromatic hydrocarbons, such as nitrobenzene, chloronitrobenzene, nitrotoluene or the like. As for the amount of the solvent mixture of the hydrophilic, organic solvent and the above-mentioned hydrophobic, aromatic system organic solvent to be used in the above-mentioned method of the present invention, any amount will be alright so long as it advances the reaction smoothly, but it is usually in the range of 0.5 to 15 times the amount by weight of phthalodinitrile can be used.

In the present invention, the crystalline forms of the metallic phthalocyanine type pigments are different according to the ratio of the aromatic type organic solvent to the hydrophilic solvent. In such case, although the ratio of the aromatic type organic solvent to be used, also varies to some extent according to the kinds of solvents, usually an unstable type can be obtained in case where the aromatic system solvent is mixed by 1 to 40% by weight based upon the total solvent; a mixture of an unstable type and a stable type can be obtained in case where the aromatic type solvent is mixed, by 40 to 60% by weight; and a stable type, can be obtained in case where the aromatic type solvent is mixed by above 60% by weight.

In such case, a surfactant may be added in order to improve the affinity of the solvents to be mixed.

As in the above-mentioned method of the present invention, an o-dinitrile type compound is reacted with a metallic substance at a low temperature in the presence of an alkaline substance, in a solvent mixture of the hydrophilic solvent and the aromatic system solvent while varying arbitrarily the mixing ratio of each solvent, to form a metallic phthalocyanine type pigment having a desired crystalline structure of a stable type or unstable type, and a pigment having a clear hue and a large coloring power can be obtained even if it is subjected to filtration, washing and drying immediately after the completion of the reaction.

The above-mentioned of the present inventions does not need any process of pulverization and pigmentation which have been regarded indispensable in the conventional methods and yet resultant product has various properties generally required for usual, metallic phthalocyanine type pigments. Particularly, the copper phthalocyanine pigment obtained according to the present invention, when it is used for practical coloring, can be, as mentioned above, easily dispersed in a vehicle without necessity of a large mechanical energy or a long time kneading as in the products obtained according to the conventional methods, because the particles are very soft, and further the dispersibility is excellent. Accordingly, it is useful in a wide variety of application field and give superior colored products.

Furthermore, it has been observed by the present inventors after further detailed studies of the above-mentioned method of the present invention that when an o-dinitrile system compound is reacted with a metallic substance capable of forming a central nucleus of phthalocyanine type pigment, at a low temperature, in the presence of an alkaline substance and in a hydrophilic, organic solvent to form a metallic phthalocyanine type pigment, and immediately thereafter a small amount of an acid is added followed by stirring, without isolation of the formed pigment, the color can be arbitrarily varied from red to yellow by changing the mixing ratio of the acid and the hydrophilic, organic solvent, the kind of the acid, the heating temperature or the stirring time.

According to the method of the present invention, a metallic phthalocyanine type pigment having a desired crystalline structure of an unstable type which has heretofore been publicly knonw, can be obtained directly in one step without isolation, by adding an acid to the hydrophilic, organic solvent followed by stirring or stirring on heating.

As the acids to be added for such post-treatment in the above-mentioned of the present invention, inorganic acids such as hydrochloric acid, nitric acid, sulfuric acid, phosphoric acid phosphoric anhdride, pyrophosphoric acid or the like, organic acids such as acetic acid, propionic acid, citric acid, oxalic acid or the like, can be used.

In the present invention, since the metallic phthalocyanine is formed at a low temperature in a hydrophilic, organic solvent, the formed particles hardly aggregate and are existent in a state of nearly primary particles and further the formation of the acid salt of phthalocyanine by the use of the acid is extremely easy. At the same time, since the removal of impurities such as metals which do not participate in the reaction, or the like, can be extremely easily carried out, a metallic phthalocyanine pigment having a clear hue and also a crystalline form extremely excellent in physical properties, can be obtained.

In the present invention, the above-mentioned acid can be used alone or as a mixture of two or more kinds. Although the amount of the acid to be used, is somewhat varied according to the kind of the hydrophilic, organic solvent, it is usually in the range of 0.5 to 75% by weight, preferably 3 50% by weight based upon the amount of the hydrophilic, organic solvent.

Such amount corresponds to about 0.015 to 2 times the amount of formed pigment, and the method of the present invention is said to be commercially advantageous even from the viewpoint that even such a small amount of the acid is sufficient. In addition, even if the amount is more than 75% by weight, the effectiveness does not increase, hence the use of excessive amount more than 75% is commercially of no meaning. Further, particularly when sulfuric acid is used, the crystalline form of the metallic phthalocyanine pigment thus obtained varies according to the concentration (% by weight) of sulfuric acid in the hydrophilic, organic solvent.

Usually, an unstable type can be obtained in a concentration of 0.5 to 42% by weight and more than 58% by weight of sulfuric acid in the above-mentioned solvent; $\gamma$-type, in a concentration of 43 to 57% by weight thereof; and a mixture of $\beta$-type and $\gamma$-type, in a concentration in the vicinity of 42% or 58% by weight thereof.

Further, in the present invention, the color of the formed pigment somewhat varies according to the kind of the hydrophilic, organic solvent or the kind of the acid, and also according to the amount of the acid to be used. Namely if a mineral acid (excluding sulfuric acid) is used, or the amount of acid to be used is large, the color tends to turn red, while if an organic acid is used, or the amount of acid to be used is small, it tends to turn yellow.

As above-mentioned, the method of the present invention compries adding an o-dinitrile type compound and a metal or metallic compound capable of forming a central nucleus of a phthalocyanine pigment into a hydrophilic, organic solvent; slowly adding an alkaline substance to the resultant mixture; reacting the mixture at a low temperature (below 100°C); thereafter adding dropwise and with stirring, an acid to the thus produced phthalocyanine pigment so that the acid and the phthalocyanine blue pigment become homogeneous in the reaction medium; if necessary heating the resultant mixture; and then filtering, washing and drying the mixture to obtain a pigment. If necessary it can be further treated with a dilute alkaline aqueous solution after the filtration. In the present invention, acid can be sufficiently removed from the resultant pigment, by means of filtration and water-washing.

In the study of the above-mentioned method of the present invention relating to the production of a metal phthalocyanine pigment by the reaction of an o-dinitrile type compound with a metallic substance capable of forming a central nucleus of phthalocyanine type pigment at a low temperature (b.p. of water, preferably a temperature below 70° C) in the presence of an alkaline substance and in a hydrophilic organic solvent, followed by the immediate addition of an acid with stirring, a new fact has been further found that a metal phthalocyanine type pigment composition which is easily dispersible within a short period of time, having a clearer hue and a larger coloring power and capable of coloring various kinds of material, can be prepared by adding a surfactant in the above-mentioned reaction medium, kneading the resultant mixture, and thereafter separating the hydrophilic, organic solvent under the atomspheric or a reduced pressure.

Since according to the above-mentioned method of the present invention, a metal phthalocyanine type pigment is formed at a low temperature in a hydrophilic, organic solvent, generally the formed particles exist in the state of being aproximately the same original particles without aggregation, and to which a surfactant is deposited or adhered to yield a pigment composition as finely divided particles.

As to the surfactant to be used in accordance with the abovementioned method of the present invention, various kinds thereof can be used according to the object of the use of the metallic phthalocyanine pigment composition. Representative surfactants include as anionic surfactants, alkylbenzenesulfonates, alkylnaphthalenesulfonates, alkylsulfosuccinates, ligninsulfonates, sulfuric acid esters of fatty alcohols, salts or sulfuric acid ester of castor oil, rosin or the like; as nonionic surfactants, polyoxyethylene fatty acid esters or ethers, polyoxyethylenealkylethers, sorbitan esters, sorbitan monohigher fatty acid salts, polyoxyethylene alkylphenols or ethers, fatty acid alkylamides or the like; and as cationic surfactants, alkyltrimethylammonium chlorides, alkylpyridinium halides, alkylbenzimidazole fatty acid amine salts, cyclohexylamine salts or the like. One or more kinds thereof can be used. Although the amount to be used varies according to their uses, they are used in an amount of 10 to 300% by weight based upon the pigment.

In the present invention, the above-mentioned surfactant may be added at any time prior to the separation of the hydrophilic, organic solvent, but it is particularly not preferred by the economical reason to add a large amount prior to or during the condensation reaction process of the metal phthalocyanine, because the reaction is hindered and requires a longer time, and hence it is generally preferred that a nonionic or anionic surfactant is added during the time of the condensation reaction of phthalocyanine; a cationic or nonionic surfactant, during the time of the addition process of acid; and a nonionic, cationic or anionic surfactant, prior to the removal of solvent.

Further, publicly known synthetic resins can be also used simultaneously according to the object.

A particularly advantageous embodiment of the present invention is a process in which one part of the above-mentioned surfactant is added prior to or during the condensation reaction process of the metal phthalocyanine; the remaining part, during or after the acid addition process and prior to the separation of the hydrophilic, organic solvent; the resultant mixture is kneaded; a dilute alkali solution is added to neutralize tha acid; thereafter the resultant pigment covered by the surfactant is separated by means of filtration, pressing or a low temperature centrifugal separation, and the hydrophilic, organic solvent is eliminated at 30° to 50° C, under the atmospheric or a suitably reduced pressure, to obtain a pigment composition. Further, in the present invention, a dry, powdery pigment composition can also be obtained by a following pulverization in a suitable milling or kneading apparatus.

In the present invention, although the object can be fully attained only by distilling off the hydrophilic, organic solvent additional filtration and washing are advantageous, because impurities can be easily removed.

The pigment compositions of the present invention are mixed into a vehicle according to the objective use and in a conventional manner, whereby water-color ink, water paint, emulsion paint, oil ink, oil paint can be prepared. Further, they can be also used in a conventional manner, for synthetic and natural rubber emulsions, pigment printing, coloring agent for spinning dope of synthetic fibers, papers, coloring materials, coloring agent in aqueous vehicle for urethane foam or the like, or oil coloring agent for synthetic resins, rubbers or the lime.

It has been also observed by the present inventors that if an o-dinitrile type compound is reacted with a metallic substance capable of forming a central nucleus of phthalocyanine type pigment, at a low temperature, in the presence of an alkaline substance and in a hydrophilic, organic solvent, thereafter sulfuric acid is directlly added without isolation of reaction product followed by stirring to form a sulfate, and then free sulfuric acid is removed by means of water or an organic solvent, then a sulfate of metal phthalocyanine type pigment can be obtained with almost no decomposition of the sulfate and in a high yield, and further such sulfate thus obtained is very stable.

In the present invention, since the metal phthalocyanine type pigment is formed at a low temperature and in a hydrophilic, organic solvent, the formed particles are existent in a state of nearly primary particles, with almost no aggregation, and the formation of the sulfate of metal phthalocyanine pigment by the use of sulfuric acid, can be very easily carried out. At the same time, since impurities such as metals which do not participate in the reaction, can be removed almost completely, the sulfate can be obtained in an extremely high purity.

Although the amount of sulfuric acid to be used for obtaining the sulfate of phthalocyanine type pigment, varies to some extent according to the kinds of the starting material or the hydrophilic organic solvent, the sulfate of copper phthalocyanine type pigment can be obtained usually when sulfuric acid is used in a proportion of 43 to 57% by weight to the organic solvent. A proportion below 43% by weight or above 58% by weight is not preferred, because a sulfate which is stable to water cannot be obtained.

In the present embodiment, since the formed sulfate of metal phthalocyanine pigment is stable to water, a very pure sulfate can be obtained only by water washing. It can be also washed with a conventional, organic solvent such as alcohol, cellosolve, cresol or the like.

The sulfate of metal phthalocyanine thus formed is in the state of primary particles in an organic solvent wherein the sulfate of metal phthalocyanine is combined with sulfuric acid, hence it has no such a drawback as in the sulfates obtained in the conventional method. In the conventional method sulfuric acid attached to the crystalline surface of the sulfate, absorbs water to cause the hydrolysis of the sulfate, resulting in the formation of original metal phthalocyanine.

Further, it is quite stable to water, can be stored for a long time, and is convenient in handling. Furthermore, when the sulfate of the present invention is hydrolyzed by an alkali with stirring at room temperature for a long time or heating, a metal phthalocyanine pigment containing almost no free metal can be obtained. Such pigment has a clear hue, its particles are very soft and excellently dispersible, and hence it can be used in a wide variety of coloring application field.

Further, it has been also found by the present inventors that copper phthalocyanine pigment having a new crystalline type can be prepared in one step reaction, by subjecting an o-dinitrile type compound and a copper substance capable of forming a central nucleus of phthalocyanine type pigment, to a condensation reaction at a low temperature in the presence of an alkaline substance and in a hydrophilic, organic solvent having a hydroxyl group.

The crystalline structure of the copper phthalocyanine pigment obtained according to the above-mentioned method, has been examined by X-ray analysis. As a result, it has been concluded that the resultant pigment has a novel crystalline structure because it shows an X ray diffraction pattern different from either of $\alpha$, $\beta$, $\gamma$ or $\delta$-type obtained by the conventional methods.

Those having known crystalline structures of $\alpha$, $\beta$, $\gamma$ and $\delta$-types show peaks at the following positions of $2\theta°$ (CuK $\alpha$ /Ni), respectively:

$\alpha$ — type — 6.9, 9.0, 10.4, 12.4, 18.0, 18.4, 21.2, 23.6, 26.0, 27.9, 30.3

$\beta$— Type — 6.8, 7.2, 9.9, 15.6, 16.0, 24.0, 24.8, 26.6, 27.4

$\gamma$—type — 6.5, 7.3, 9.7, 10.4, 15.5, 21.3, 23.8, 24.9, 26.3, 27.7, 30.2

$\delta$— Type — 7.3, 9.3, 14.2, 17.7, 21.6, 21.8, 23.7, 28.7, 30.1

(See: "Dyes and Chemicals," vol. 10, No. 6, p.244, 1965)

On the other hand, the pigment of the present invention shows peaks at 6.8, 9.8, 15.6, 24.8, 25.2, 25.6, 26.8 of $2\theta°$ (CuK $\alpha$/Ni), and hence it is concluded that the pigment is a copper phthalocyanine pigment having a novel crystalline form.

The present invention will be more concretely illustrated by the following Examples. These parts described in the Examples are by weight.

EXAMPLE 1.

To 120 parts of methanol were added 32 parts of phthalodinitrile, 6.8 parts of cuprous chloride, and 3.4 parts of sodium hydroxide. The mixture was stirred at room temperature for 25 hours and filtered. The resulting product was then fully washed with methanol and water successively and dried to obtain 25.0 parts of copper phthalocyanine pigment. The X-ray diffraction pattern shows the novel crystal form of the copper phthalocyanine pigment of this invention, as illustrated in the drawing.

EXAMPLE 2.

To 120 parts of methanol were added 32 parts of phthalodinitrile, 6.2 parts of cuprous chloride, and 3.0 parts of sodium hydroxide. The mixture was stirred at room temperature for 10 hours, and at the reflux temperature of methanol for additional 5 hours. The resulting product was recovered by filtration and washed with water. The solid product was then treated with 720 parts each of 1% aqueous hydrochloric acid solution and 1% aqueous sodium hydroxide solution at 95° C for 30 minutes, respectively. The product was washed with water and dried to obtain 26.2 parts of the copper phthalocyanine pigment. The product shows the same X-ray diffraction pattern as that illustrated in the drawing of Example 1.

EXAMPLE 3

To 120 parts of methanol were added 32 parts of phthalodinitrile, 6.2 parts of cuprous chloride, and 2.8 parts of sodium hydroxide. The mixture was stirred at room temperature for 1 hour and at the reflux temperature for additional 10 hours, and filtered. The product was then washed sufficiently with methanol and water successively and dried to obtain 25.5 parts of the copper phthalocyanine pigment. The procuct shows the same X-ray diffraction pattern as that illustrated in the drawing of Example 1.

EXAMPLE 4

To 120 parts of methanol were added 32 parts of phthalodinitrile, 4 parts of copper powder, and 4.5 parts of sodium peroxide. The mixture was stirred at room temperature for 10 hours and at the reflux temperature of methanol for additional 7 hours, and was filtered. The resulting product was treated according to the procedure described in Example 2 to obtain 27.5 parts of the copper phthalocyanine pigment. The product shows the same X-ray diffraction pattern as that illustrated in the drawing of Example 1.

EXAMPLE 5

To 100 parts of ethanol were added 32 parts of phthalodinitrile 4 parts of copper powder, 3.9 parts of sodium peroxide, and 1.0 part of sodium hydroxide. The mixture was stirred at room temperature for 10 hours and then at the reflux temperature of ethanol for additional 7 hours, and was filtered. Thereafter, following the similar manner as in Example 2, the product was treated to obtain 25.9 parts of the copper phthalocyanine pigment. The product shows the same X-ray diffraction pattern as that illustrated in the drawing of Example 1.

EXAMPLE 6

To 180 parts of methanol were added 51.6 parts of sulfophthalodinitrile, 8.4 parts of cupric chloride, and 5.7 parts of sodium hydroxide. The mixture was stirred at room temperature for 8 hours and then at the reflux temperature of methanol for additional 10 hours, and was filtered. The resulting product was washed with methanol and water successively and dried to obtain 25.1 parts of phthalocyanine pigment.

EXAMPLE 7

To 120 parts of isopropanol were added 43.3 parts of nitrophthalodinitrile, 6.2 parts of curprous chloride, and 3.2 parts of potassium hydroxide. The mixture was stirred for 3 hours at room temperature and then at the reflux temperature of isopropanol for additional 10 hours, and was filtered. Thereafter, following the similar manner as in Example 2, the product was treated to obtain 27.9 parts of the phthalocyanine pigment.

EXAMPLE 8.

To 120 parts of methanol were added 35.8 parts of aminophthalodinitrile, 6.8 parts of cuprous chloride and 3.2 parts of sodium hydroxide, and 10 parts of pyridine was then added dropwise to the mixture while stirring the mixture for 1 hour. The mixture was further reacted by continuing the stirring at the reflux temperature for another 10 hours, and was filtered. Thereafter, following the similar manner as in Example 2, the product was treated to obtain 28.0 parts of phthalocyanine pigment.

EXAMPLE 9

To 100 parts of ethanol were added 35.5 parts of methylphthalodinitrile, 10.9 parts of cupric sulfate, 6.5 parts of potassium hydroxide, and 4 parts of sodium bisulfite. The mixture was stirred at room temperature for 1 hour and then at the reflux temperature of ethanol for 10 hours, and was filtered. Thereafter, following the similar manner as in Example 2, the product was treated to obtain 24.0 parts of the phthalocyanine pigment.

EXAMPLE 10

To 150 parts of butanol were added 32 parts of phthalodinitrile, 6.8 parts of cuprous chloride, 3.0 parts of sodium hydroxide, and 6 parts of urea. The mixture was stirred at room temperature for 3 hours and at a temperature in the range of 80° to 85° C for additional 10 hours, and was filtered. Thereafter, in the similar manner as in Example 2, the product was treated to obtain 26.5 parts of the phthalocyanine pigment. The product shows the same X-ray diffraction pattern as that illustrated in the drawing of Example 1.

EXAMPLE 11

To 180 parts of methanol were added 39.5 parts of methoxyphthalodinitrile, 6.8 parts of cuprous chloride, and 3.0 parts of sodium hydroxide. The mixture was stirred at room temperature for 3 hours under the ammonia gas stream and then at the reflux temperature of methanol for 10 hours, and was filtered. The resulting product was sufficiently washed with methanol and water successively and dried to obtain 25.4 parts of the phthalocyanine pigment.

EXAMPLE 12

To 150 parts of diethylene glycol ethyl ether were added 32 parts of phthalodinitrile, 6.8 parts of cuprous chloride, and 3.0 parts of sodium hydroxide. The mixture was stirred at a temperature in the range of 65° to 70° C for 10 hours, and was filtered at the end of the reaction time. Thereafter, in the similar manner as in Example 2, the product was treated to obtain 24.0 parts of the phthalocyanine pigment. The product shows the same X-ray diffraction pattern as that illustrated in the drawing of Example 1.

EXAMPLE 13

To 120 parts of methanol were added 44.5 arts of 2,3-dinitrilenaphthalene, 12.5 parts of copper acetate and 5.5 parts of sodium hydroxide. Then 2 parts of ethanol amine was added and the mixture was stirred at room temperature for 2 hours and then at the reflux temperature of methanol for 10 hours, and was filtered at the end of the reaction time. Thereafter, in the similar manner as in Example 2, the product was treated to obtain 30.6 parts of the copper naphthocyanine pigment.

EXAMPLE 14

To 150 parts of methanol were added 57 parts of 2,3-dinitrileanthracene, 15.1 parts of copper nitrate, 4.8 parts of sodium hydroxide and 2 parts of sodium carbonate. The mixture was stirred at room temperature for 5 hours and than at the reflux temperature of methanol for 8 hours, and was filtered at the end of the reaction time. Thereafter, in the similar manner as in Example 2, the product was treated to obtain 32.0 parts of anthracyanine pigment.

EXAMPLE 15

To a solvent mixture of 50 parts of ethanol and 70 parts of ethylene glycol were added 57 parts of 2,3-dinitrile-phenanthrene, 8.4 parts of cupric chloride, 2.5 parts of sodium hydroxide, and 6.4 parts of sodium hydrosulfite. The mixture was stirred at room temperature for 2 hours and then at a temperature in the range of 70° to 75° C for 10 hours, and was filtered at the end of the reaction time. Thereafter, in the similar manner as in Example 2, the product was treated to obtain 31.5 parts of copper-phenanthrocyanine pigment.

EXAMPLE 16

To 150 parts of butanol were added 32 parts of phthalodinitrile, 6.8 parts of cuprous chloride, and 3.8 parts of sodium hydroxide. After 3 parts of ethylene diamine was added, the mixture was stirred at room temperature for 2 hours and at a temperature in the range of 75 to 80° C for 10 hours, and was filtered at the end of the reaction time. Thereafter, in the similar manner as in Example 2, the product was treated to obtain 25.4 parts of the copper-phthalocyanine pigment. The product shows the same X-ray diffraction pattern as that illustrated in the drawing of Example 1.

EXAMPLE 17

To 30 parts of methanol were added 32 parts of phthalodinitrile, 6.2 parts of cuprous chloride, and 3.2 parts of sodium hydroxide. The mixture was stirred by a kneader at a temperature in the range of 25° to 30° C for 2 hours, and the reaction was continued with stirring for another 10 hours under reflux.

The resulting product was then added to a large amount of methanol, mixed and stirred well, and filtered. The product was again washed with methanol, an then washed several times with water and dried to obtain 25 parts of the copper-phthalocyanine pigment. A copper-phthalocyanine pigment with similar properties is obtained by using 30 parts of polyethyleneglycol in stead of methanol.

EXAMPLE 18

To 200 parts of ethanol were added 32 parts of phthalodinitrile, 8.3 parts of nickel chloride, and 5.7 parts of sodium hydroxide. The mixture was stirred at room temperature for 2 hours and further stirred for 10 hours under ammonia gas stream and the reflux condition, and was filtered. The product was then washed with water, and treated with 720 parts each of 1% aqueous hydrochloric acid solution and 1% aqueous sodium hydroxide solution with at 95°C for 30 minutes. The resulting product was washed with water and dried to obtain 26.3 parts of nickel-phthalocyanine pigment.

EXAMPLE 19

To 120 parts of methanol were added 32 parts of phthalodinitrile, 8.2 parts of cobalt chloride, and 5.7 parts of sodium hydroxide. The reaction was carried out by stirring the mixture for 10 hours under the reflux conditions of methanol. After filtered, the product was washed sufficiently with methanol and with water and dried to obtain 25.9 parts of cobalt-phthalocyanine pigment.

EXAMPLE 20

To 150 parts of ethylene glycol were added 32 parts of phthalodinitrile, 10.5 parts of cobalt sulfate, 5.7 parts of sodium hydroxide, and 1.5 part of sodium hydrosulfite. The mixture was stirred at a temperture in the range of 70° to 75° C for 10 hours, and was filtered at the end of the reaction time. The resulting product was washed with water. The remaining solid was treated with 720 parts each of 1% aqueous hydrochloric acid solution and 1% aqueous sodium hydroxide solution both at 95° C for 30 minutes. After washed with water, the product was dried to obtain 25.5 parts of the cobalt-phthalocyanine pigment.

EXAMPLE 21

To 150 parts of diethylene glycol monoethyl ether were added 32 parts of phthalodinitrile, 15 parts of potassium hydroxide, 8.5 parts of zinc chloride, and 2 parts of ethanolamine. The mixture was stirred at a temperature in the range of 65° to 70° C for 10 hours, and was filtered at the end of the reaction time. The product was washed with methanol, and the remaining solid was treated with 720 parts each of 1% aqueous hydrochloride acid solution and 1% aqueous sodium hydroxide solution both at 95° C for 30 minutes. The product was washed with water and dried to obtain 23.0 parts of zinc-phthalocyanine pigment.

EXAMPLE 22

To a solvent mixture of 100 parts of methanol and 30 parts of dimethylformamide were added 32 parts of phthalodinitrile, 4.8 parts of sodium peroxide, and 6.0 parts of metallic molybdenum. The mixture was stirred at room temperature for 2 hours and then at a temperature in the range of 65° to 70° C for additional 10 hours. After filtered, the product was sufficiently washed with methanol and water successively. The remaining solid was then treated with 720 parts each 1% aqueous hydrochloric acid solution and 1% aqueous sodium hydroxide solution both at 20° C for 2 hours. The product was washed with water and dried to obtain 20.0 parts of molybdenumphthalocyanine pigment.

EXAMPLE 23

To 120 parts of methanol were added with stirring 32 parts of phthalodinitrile, 6.8 parts of cuprous chloride, and 5.8 parts of potassium oxide. The mixture was stirred at a temperature in the range of 25° to 30° C for 1 hour. The reaction was further continued by stirring the mixture for another 10 hours under reflux. The resultng product was filtered off and washed with methanol and then with water successively. The remaining solid was next treated with 720 parts of 1% aqueous hydrochloric acid solution at 95° C for 1 hour and with 720 parts of 1% aqueous sodium hydroxide solution both at 95° C for 30 minutes. The product was washed with water and dried to obtain 28.1 parts of the blue-colored copper phthalocyanine pigment.

EXAMPLE 24

To 150 parts of ethanol were added with stirring 32 parts of phthalodinitrile, 8.4 parts of cupric chloride, and 4.1 parts of sodium oxide. The mixture was stirred at a temperature in the range of 25° to 30° C for 4 hours and the reaction was continued by stirring the mixture for additional 8 hours under reflux. After filtration, the resulting product was treated in the similar manner as in Example 23 to obtain 28.2 parts of the blue-colored copper-phthalocyanine pigment.

EXAMPLE 25

To 150 parts of butanol were added with stirring 32 parts of phthalodinitrile, 10.9 parts of copper sulfate, and 11.0 parts of barium oxide. The mixture was stirred at a temperature in the range of 25° to 30° C for 2 hours and the reaction was continued by stirring the mixture for additional 10 hours at a temperature in the range of 80° to 85° C. After filtration, the resulting product was then treated in the similar manner as in Example 23 to obtain 25.2 parts of the blue-colored copper-phthalocyanine pigment.

EXAMPLE 26

To 180 parts of polyethylene glycol were added with stirring 32 parts of phthalodinitrile, 7 parts of nickel oxide, and 7.5 parts of calcium oxide. The mixture was stirred at a temperature in the range of 25° to 30° C for one hour, and the reaction was further continued by stirring the mixture at a temperature in the range of 85 to 90° C for 10 hours. After filtration, the resulting product was treated in the similar manner as in Example 23 to obtain 25.8 parts of blue-colored nickel-phthalocyanine pigment.

EXAMPLE 27

To 150 parts of methyl cellosolve were added with stirring 32 parts of phthalodinitrile, 18.2 parts of nickel nitrate, and 7.5 parts of potassium oxide. The mixture was stirred at a temperature in the range of 25° to 30° C for one hour, and the reaction was further continued for 10 hours at a temperature in the range of 65° to 70° C. After filtration, the resulting product was treated in the similar manner as in Example 23 to obtain 27.1 parts of the blue-colored nickel-phthalocyanine pigment.

EXAMPLE 28

To 150 parts of methanol were added with stirring 32 parts of phthalodinitrile, 18.2 parts of cobalt nitrate, and 7.5 parts of calcium oxide. The mixture was stirred at a temperature in the range of 25° to 30° C for half an hour, and the reaction was further continued by stirring the mixture for additional 10 hours at the reflux temperature of methanol. After filtration, the resulting product was treated in the similar manner as in Example 23 to obtain 27.6 parts of the blue-colored cobalt-phthalocyanine pigment.

EXAMPLE 29

To 180 parts of phenol were added with stirring 32 parts of phthalodinitrile, 15.6 parts of cobalt acetate, and 5.5 parts of sodium oxide. The mixture was stirred at a temperature in the range of 50° to 60° C for one hour, and the reaction was further continued by stirring the mixture for additional 10 hours at a temperature in the range of 70° to 80° C. After filtration, the resulting product was then treated in the similar manner as in Example 23 to obtain 25.5 parts of the blue-colored cobalt-phthalocyanine pigment.

EXAMPLE 30

To 180 parts of o-cresol were added with stirring 32 parts of phthalodinitrile, 12.6 parts of molybdenum chloride, and 8.0 parts of magnesium oxide. The mixture was stirred at a temperature in the range of 40° to 50° C for one hour, and the reaction was further continued by stirring the mixture for another 10 hours at a temperature in the range of 80° to 85° C. After filtration, the resulting product was then treated in the similar manner as in Example 23 to obtain 20.2 parts of the bluish green-colored molybdenum-phthalocyanine pigment.

EXAMPLE 31

To a mixture of 150 parts of phenol and 50 parts of methanol were added with stirring 16 parts of phthalodinitrile, 20.3 parts of 4-chloro-phthalodinitrile, 2.0 parts of copper powder, 3.1 parts of cuprous chloride, 4.0 parts of calcium oxide, and 0.5 part of magnesium oxide. The mixture was stirred at a temperature in the range of 25° to 30° C for one hour. The reaction was further continued by stirring the mixture at a temperature in the range of 70° to 75° C for 10 hours. After filtration, the resulting product was treated in the similar manner as in Example 23 to obtain 28.5 parts of the blue-colored chloro-copper-phthalocyanine pigment.

EXAMPLE 32

To 180 parts of methanol were added with stirring 16 parts of phthalodinitrile, 33.2 parts of tetrachloro-phthalodinitrile, 8.4 parts of cupric chloride, and 5.8 parts of sodium oxide. The mixture was stirred at a temperature in the range of 25° to 30° C for one hour, and the reaction was further continued by stirring the mixture under reflux for 12 hours. After filtration, the resulting product was treated in the similar manner as in Example 23 to obtain 33.2 parts of the bluish green-colored octachloro-copper-phthalocyanine pigment.

EXAMPLE 33

To a mixture of 150 parts of methanol and 80 parts of ethylene glycol were added with stirring 16 parts of phthalodinitrile, 35.7 parts of dibromo-phthalodinitrile, 6.8 parts of cuprous chloride, 5.0 parts of barium oxide, and 5.0 parts of strontium oxide. The mixture was stirred at a temperature in the range of 25° to 30° C for one hour, and the reaction was further continued by stirring the mixture at a temperature in the range of 70° to 80° C for 10 hours. After filtration, the resulting product was treated in the similar manner as in Example 23 to obtain 36.2 parts of the bluish green-colored tetrabromo-copper-phthalocyanine pigment.

EXAMPLE 34

To 170 parts of ethanol were added with stirring 16 parts of phthalodinitrile, 31.8 parts of monoiodo-phthalodinitrile, 6.8 parts of cuprous chloride, and 4.8 parts of calcium oxide. The mixture was stirred at a temperature in the range of 25° to 30° C for one hour, and the reaction was further continued by stirring the mixture at the reflux temperature of ethanol for 10 hours. After filtration, the resulting product was treated in the similar manner as in Example 23 to obtain 32.5 parts of the bluish green-colored diodo-copper-phthalocyanine pigment.

EXAMPLE 35

To a mixture of 50 parts of phenol and 100 parts of methanol were added with stirring 40.3 parts of mono-chloro-phthalodinitrile, 12.3 parts of cupric nitrate, and 4.9 parts of sodium peroxide. The mixtue was stirred at a temperature in the range of 25° to 30° C for half an hour, and the reaction was further continued by stirring the mixture at a temperature in the range of 65° to 70° C for 10 hours. After filtration, the resulting product was treated in the similar manner as in Example 23 to obtain 31.1 parts of the blue-colored tetrachloro-copper-phthalocyanine pigment.

EXAMPLE 36

To a mixture of 100 parts of benzene and 200 parts of ethanol were added with stirring 60.5 parts of tetrachloro-phthalodinitrile, 8.4 parts of cupric chloride, and 4.2 parts of potassium oxide. The mixture was stirred at a temperature in the range of 25° to 30° C for one hour, and the reaction was further continued for 10 hours under reflux. After filtration, the resulting product was then treated in the similar manner as in Example 22 to obtain 40.2 parts of the green-colored hexadecachloro-copper-phthalocyanine pigment.

EXAMPLE 37

To a mixture of 100 parts of propanol and 50 parts of phenol were added with stirring 71.5 parts of dibromo-phthalodinitrile, 8.4 parts of cupric chloride, 7.8 parts of potassium oxide, and 0.5 part of calcium oxide. The mixture was stirred at a temperature in the range of 25° to 30° C for one hour, and the reaction was further continued by stirring the mixture at a temperature in the range of 80° to 85° C for 15 hours. After filtration, the resulting product was treated in the similar manner as in Example 23 to obtain 45.5 parts of the green-colored octabromo-copper-phthalocyanine pigment.

EXAMPLE 38

To a mixture of 50 parts of xylol and 150 parts of methanol were added with stirring 63.5 parts of monoiodo-phthalodinitrile, 10.9 parts of copper sulfate, and 5.5 parts of sodium oxide. The mixture was stirred at a temperature in the range of 25° to 30° C, for one hour, and the reaction was further continued by stirring the mixture for 10 hours under reflux. After filtration, the resulting product was treated in the similar manner as in Example 23 to obtain 42.5 parts of the bluish green-colored monoiodo-copper-phthalocyanine pigment.

EXAMPLE 39

To 150 parts of methanol were added 40.7 parts of monochloro-phthalodinitrile, 6.8 parts of cuprous chloride, 3.0 parts of sodium hydroxide and 1.0 part of sodium carbonate. The mixture, was stirred at room temperature for 2 hours, and the reaction was further continued by stirring the mixture under the reflux condition of methanol for additional 15 hours. After filtration, the resulting product was sufficiently washed with methanol and then with water, and dried to obtain 30.0 parts of the blue-colored tetrachloro-copper-phthalocyanine pigment.

EXAMPLE 40

To 150 parts of ethanol were added 40.7 parts of 4-chlorophthalodinitrile, 10.9 parts of copper sulfate, and 10.0 parts of potassium hydroxide. The mixture was stirred at room temperature for 2 hours and the reaction was further continued by stirring the mixture under the reflux condition of ethanol for 12 hours. The mixture was then filtered. The solid was washed with water, and treated with 720 parts each of 1% aqueous hydrochloride acid solution and 1% aqueous sodium hydroxide solution both at 95° C for 30 minutes. The product was washed with water and dried to obtain 30.5 parts of the green-colored tetrachloro-copper-phthalocyanine pigment.

EXAMPLE 41

To 150 parts of methanol were added 40.7 parts of monochloro-phthalodinitrile, 15.1 parts of cuprous nitrate, 6.5 of sodium hydroxide, and 2 parts of pyridine. The mixture was stirred at room temperature for 2 hours. The reaction was further carried out by stirring the mixture for 10 hours under the reflux condition of methanol. After filtration, the resulting product was sufficiently washed with methanol and then with water and dried to obtain 31.8 parts of the blue-colored tetrachloro-copper-phthalocyanine pigment.

EXAMPLE 42.

To a solvent mixture of 70 parts of ethylene glycol and 50 parts of ethanol were added 51.6 parts of monobromo-phthalodinitrile, 8.4 parts of cupric chloride, 5.5 parts of sodium hydroxide, and 6.4 parts of sodium hydrosulfite. The reaction was carried out by stirring the mixture at room temperature for 2 hours and than at a temperature in the range of 70° to 75° C for 10 hours. After filtration, the resulting product was sufficiently washed with methanol and then with water and dried to obtain 36.5 parts of the bluish green-colored tetrabromo-copper-phthalocyanine pigment.

EXAMPLE 43

To 180 parts of methanol were added 49.2 parts of dichlorophthalodinitrile, 12.5 parts of copper acetate, and 6.5 parts of sodium hydroxide. The reaction was carried out by stirring the mixture first at room temperature under ammonia gas stream for 3 hours and then under the reflux condition of methanol for 10 hours. After filtration and water-washing, the resulting solid was then treated with 720 parts each of 1% aqueous hydrochloric acid solution and 1% aqueous sodium hydroxide solution both at 95° C for 30 minutes. The product was washed with water and dried to obtain 37.1 parts of the bluish green-colored octachloro-copper-phthalocyanine pigment.

EXAMPLE 44

To 150 parts of ethanol were added 66.6 parts of tetrachloro-phthalodinitrile, 4 parts of copper powder, 4.0 parts of sodium hydroxide, and 0.5 part of sodium peroxide. The reaction was carried out by stirring the mixture first at room temperature for 2 hours and then under the reflux condition of ethanol for 15 hours. After filtration, the resulting product was sufficiently washed with water and dried to obtain 42.7 parts of the green-colored hexadecachloro-copper-phthalocyanine pigment.

EXAMPLE 45

To 150 parts of butanol were added 66.6 parts of tetrachloro-phthalodinitrile, 8.4 parts of cupric chloride, 6.2 parts of sodium hydroxide, and 3.2 parts of sodium hydrosulfite. The reaction was carried out by stirring the mixture first at room temperature for 3 hours and then at a temperature in the range of 75° to 80° C for 10 hours. After filtration, the resulting product was sufficiently washed with methanol and then with water and dried to obtain 43.6 parts of the green-colored hexadeca-copper-phthalocyanine pigment.

EXAMPLE 46

To 250 parts of ethylene glycol were added 66.6 parts of tetrachloro-phthalodinitrile, 8.4 parts of cupric chloride, 4.8 parts of sodium hydroxide, and 2 parts of sodium carbonate. The reaction was carried out by stirring the mixture at room temperature for 5 hours and then at a temperature of 70° C for 15 hours. After filtration, the resulting product was fully washed with methanol and then with water and dried to obtain 43.1 parts of the green-colored hexadeca-copper-phthalocyanine pigment.

EXAMPLE 47

To 250 parts of butanol were added 71.5 parts of dibromophthalodinitrile, 5.0 parts of cupric oxide, 5.4 parts of sodium hydroxide, and 6 parts of urea. The reaction was carried out by stirring the mixture first at room temperature for 4 hours and then at a temperature in the range of 75° to 80° C for 10 hours. After filtration, the resulting product was sufficiently washed with methanol and then with water and dried to obtain 42.5 parts of the green-colored octabromo-copper-phthalocyanine pigment.

EXAMPLE 48

To 150 parts of methanol were added 25.8 parts of bromophthalodinitrile, 16 parts of phthalodinitrile, 6.8 parts of cuprous chloride, and 3.2 parts of sodium hydroxide. The reaction was carried out by stirring the mixture first at room temperature for 2 hours and then under the reflux condition of methanol for 10 hours. After filtration and water-washing, the resulting product was then treated with 720 parts each of 1% aqueous hydrochloric acid solution and 1% sodium hydorxide solution both at 95° C for 30 minutes. The product was washed with water and dried to obtain 31.4 parts of the bluish green-colored dibromo-copper-phthalocyanine pigment.

EXAMPLE 49

To 150 parts of methanol were added 20.4 parts of monochloro-phthalodinitrile, 16.0 parts of phthalodinitrile, 4.2 parts of sodium peroxide, and 4.0 parts of copper powder. The reaction was carried out by stirring the mixture first at room temperature for 5 hours and then under the reflux condition of methanol for 10 hours. After filtration, the resulting product was sufficiently washed with methanol and then with water, and was treated with 720 parts each of 1% aqueous hydrochloric acid solution and 1% aqueous sodium hydroxide solution both at 95° C for 30 minutes. The product was washed with water and dried to obtain 28.3 parts of the green-colored dichloro-copper-phthalocyanine pigment.

EXAMPLE 50

To 200 parts of diethylene glycol monoethyl ether were added 40.8 parts of monochloro-phthalodinitrile, 8.5 parts of potassium hydroxide, 2 parts of ethanolamine, and 10.9 parts of copper sulfate. The reaction was carried out by stirring the mixture first at room temperature for 3 hours and then at a temperature in the range of 65° to 70° C for 10 hours. The resulting product was suffficiently washed with methanol and then with water. The remaining solid was further treated with 720 parts each of 1% aqueous hydrochloric acid solution and 1% sodium hydroxide solution both at 95° C for 30 minutes. After filtration, the product was washed with water and dried to obtain 29.1 parts of the bluish green-colored tetrachloro-copper phthalocyanine pigment.

EXAMPLE 51.

To 150 parts of phenol were added 32 parts of phthalodinitrile, 10.0 parts of copper sulfate, 7.5 parts of potassium hydroxide, and 2.5 parts of ethanolamine. The reaction was carried out by stirring the mixture first at 50° to 60° C for 3 hours and then at a temperature in the range of 70° to 75° C for 10 hours. After filtration, the solid was washed with water and treated with 720 parts each of 1% aqueous hydrochloric acid solution and 1%l aqueous hydroxide solution both at 95° C for 30 minutes. The product was washed with water and tried to obtain 19.6 parts of copper-phthalocyanine pigment. This substance has a well known α -type crystal form which shows peaks at the X-ray diffraction angles, of $2\theta \pm 0.2°$ (Cu K α /Ni), of 6.9, 9.0, 10.4, 12.4, 18.0, 18.4, 21.2, 23.6, 26.0, 27.9 and 30.3.

EXAMPLE 52

To a solvent mixture of 60 parts of phenol and 60 parts of o-xylol were added 32 parts of phthalodinitrile, 8.4 parts of cupric chloride, and 5.5 parts of sodium hydroxide. The reaction was carried out by stirring the mixture first at room temperature for 5 hours and then at a temperature in the range of 70° to 75° C for 10 hours. After filtration, the resulting product was washed with methanol and then with water and dried to obtain 22.8 parts of the copper-phthalocyanine pigment. The product shows the same X-ray diffraction pattern as that illustrated for the product in Example 51.

EXAMPLE 52–70

In the similar manner as in the foregoing examples, but using the materials described in the following table, the corresponding phthalocyanine pigments may be obtained.

Table I

| Examples | o-dinitrile compounds | Parts | Metallic materials | Parts |
|---|---|---|---|---|
| 53 | phthalodinitrile | 32 | copper powder | 4.0 |
| 54 | phthalodinitrile | 32 | cobalt chloride | 8.3 |
| 55 | phthalodinitrile | 32 | nikel chloride | 8.3 |
| 56 | phthalodinitrile | 32 | zinc chloride | 8.5 |
| 57 | phthalodinitrile | 32 | stannous chloride | 11.9 |
| 58 | phthalodinitrile | 32 | lead sulfate | 19.0 |
| 59 | phthalodinitrile | 32 | vanadium chloride | 7.6 |
| 60 | phthalodinitrile | 32 | chromous chloride | 7.7 |
| 61 | phthalodinitrile | 32 | manganese chloride | 7.9 |
| 62 | phthalodinitrile | 32 | ferrous sulfate | 9.5 |
| 63 | phthalodinitrile | 32 | palladium chloride | 13.3 |
| 64 | phthalodinitrile | 32 | platinum chloride | 15.6 |
| 65 | monochloro-phthalodinitrile | 40.6 | cuprous chloride | 6.2 |
| 66 | methoxy-phthalodinitrile | 39.5 | copper sulfate | 15.5 |
| 67 | phthalodinitrile monochloro-phthalodinitrile | 16.0 20.3 | cupric chloride | 8.4 |
| 68 | methyl-phthalodinitrile | 35.5 | cupric chloride | 8.4 |
| 69 | 2,3-dinitrile-naphthalene | 44.5 | cuprous chloride | 6.2 |
| 70 | 2,3-dinitrile-pyridine | 32.0 | copper sulfate | 15.5 |

| Exam- | Alkaline | Hydrophilic | Yield |

Table I-Continued

| Examples | o-dinitrile compounds materials | Parts | Metallic materials organic solvents | Parts | Parts |
|---|---|---|---|---|---|
| 53 | sodium hydroxide | 3.2 | methanol | 120 | 20.2 |
| 54 | sodium hydroxide | 3.2 | ethanol | 120 | 21.5 |
| 55 | sodium hydroxide | 3.2 | isopropanol | 130 | 20.3 |
| 56 | potassium hydroxide | 4.2 | ethylene glycol | 150 | 22.8 |
| 57 | sodium oxide | 3.0 | methyl cellosolve | 100 | 25.9 |
| 58 | sodium peroxide | 3.4 | methanol | 120 | 26.8 |
| 59 | sodium peroxide | 3.4 | methanol | 120 | 20.0 |
| 60 | sodium peroxide | 3.4 | methanol | 120 | 25.2 |
| 61 | sodium peroxide | 3.6 | methanol | 120 | 23.2 |
| 62 | potassium hydroxide | 4.2 | phenol | 130 | 27.2 |
| 63 | sodium hydroxide | 3.4 | o-cresol | 130 | 18.6 |
| 64 | potassium peroxide | 4.2 | butanol | 120 | 16.5 |
| 65 | sodium hydroxide | 3.2 | ethyl cellosolve | 100 | 30.1 |
| 66 | sodium hydroxide | 3.6 | diethylene glycol ethyl ether | 120 | 31.5 |
| 67 | sodium hydroxide | 3.6 | p-cresol | 130 | 29.5 |
| 68 | sodium hydroxide | 3.6 | m-cresol | 130 | 28.5 |
| 69 | lithium hydroxide | — | methanol | 120 | 29.1 |
| 70 | beryllium hydroxide | — | methanol | 120 | 25.0 |

EXAMPLE 71

To 120 parts of methanol were added with stirring 32 parts of phthalodinitrile, 6.2 parts of cuprous chloride, 2.5 parts of ammonium chloride, and 4.5 parts of sodium hydroxide. The mixture was stirred at a temperature in the range of 25° to 30° C for one hour, and the reaction was further continued by stirring the mixture under reflux for 10 hours. After filtration, the resulting product was washed with methanol and then with water, and was treated with 720 parts each of 1% aqueous hydrochloric acid solution and 1% aqueous sodium hydroxide solution both at 95° C for one hour. The product was washed with water and dried to obtain 28.1 parts of the blue-colored copper-phthalocyanine pigment.

EXAMPLE 72

To 100 parts of methanol were added with stirring 32 parts of phthalodinitrile, 8.4 parts of cupric chloride, 1.0 part of ammonium chloride, 2.0 parts of ammonium pyrophosphate, 4.5 parts of sodium hydroxide, and 2.0 parts of sodium carbonate. The mixture was stirred at a temperature in the range of 25° to 30° C for one hour, and the reaction was further continued by stirring the mixture under reflux for 10 hours. After filtration, the resulting product was washed with methanol and then with water, and was treated with 720 parts each of 1% aqueous hydrochloric acid solution and 1% aqueous sodium hydroxide solution both at 95° C for one hour. The product was washed with water and dried to obtain 28.5 parts of the blue-colored copper-phthalocyanine pigment.

EXAMPLE 73

To 180 parts of methanol were added with stirring 43.3 parts of nitro-phthalodinitrile, 10.9 parts of copper sulfate, 2.5 parts of ammonium acetate, and 8.5 parts of potassium hydroxide. The mixture was stirred at a temperature in the range of 25° to 30° C for one hour, and the reaction was further continued by stirring the mixture at a temperature in the range of 75° to 80° C for 10 hours. After filtration, the resulting product was washed with methanol and then with water, and was treated with 720 parts each of 1% aqueous hydrochloric acid solution and 1% sodium hydroxide solution both at 95° C for one hour. The product was washed with water and dried to obtain 32.6 parts of the phthalocyanine pigment.

EXAMPLE 74

To 150 parts of ethyl Cellosolve were added with stirring 36 parts of methyl-phthalodinitrile, 12.5 parts of cuprous acetate, 4.0 parts of ammonium citrate, and 7.5 parts of sodium hydroxide. The mixture was stirred at a temperature in the range of 25° to 30° C for one hour, and the reaction was continued by further stirring the mixture at a temperature in the range of 65° to 80° C for 10 hours. After filtration, the resulting product was washed with methanol and then with water, and was treated with 720 parts each of 1% aqueous hydrochloric acid solution and 1% aqueous sodium hydroxide solution both at 95° C for one hour. The product was washed with water and dried to obtain 30.1 parts of the phthalocyanine pigment.

EXAMPLE 75

To 180 parts of ethanol were added with stirring 32 parts of phthalodinitrile, 8.3 parts of nickel chloride, 2.0 parts of ammonium acetate, and 8.5 parts of potassium hydroxide. The mixture was stirred at a temperature in the range of 25° to 30° C for one hour, and the reaction was further continued by stirring the mixture under reflux for 10 hours. After filtration, the resulting product was washed with methanol and then with water, and was treated with 720 parts each of 1% aqueous hydrochloric acid solution and 1% aqueous sodium hydroxide solution at 95° C both for one hour. The product was washed with water and dried to obtain 28.2 parts of the blue-colored nickel-phthalocyanine pigment.

EXAMPLE 76

To 120 parts of isopropanol were added with stirring 32 parts of phthalodinitrile, 4.7 parts of nickel oxide, 1.5 parts of ammonium metaphosphate, and 6.0 parts of sodium peroxide. The mixture was stirred at a temperature in the range of 25° to 30° C for one hour, and the reaction was further continued by stirring the mixture at a temperature in the range of 75° to 80° C for 10 hours. After filtration, the resulting product was washed with methanol and then with water, and was treated with 720 parts each of 1% aqueous hydrochloric acid solution and 1% aqueous sodium hydroxide solution both at 95° C for one hour. The product was washed with water and dried to obtain 28.0 parts of the blue-colored nickel-phthalocyanine pigment.

EXAMPLE 77

To 150 parts of ethanol were added with stirring 32 parts of phthalodinitrile, 17.6 parts of cobalt sulfate, 1.0 part of ammonium chloride, 7.5 parts of potassium peroxide, and 100 parts of ethylene glycol. The reaction was carried out by stirring the mixture first at a temperature in the range of 25° to 30° C for one hour and then in the range of 70° to 75° C for 10 hours. After filtration, the resulting product was washed with methanol and then with water, and was treated with 720 parts each of 1% aqueous hydrochloric acid and solution and 1% aqueous sodium hydroxide solution both at 95° C for one hour. The product was washed with water and dried to obtain 27.7 parts of the blue-colored cobalt-phthalocyanine pigment.

EXAMPLE 78

To 150 parts of methanol were added with stirring 32 parts of phthalodinitrile, 18.2 parts of cobalt nitrate, 2.0 parts of ammonium sulfate, 2.0 parts of urea, and 6.0 parts of sodium hydroxide. The reaction was carried out by stirring the mixture at a temperature in the range of 25° to 30° C for one hour and then at 75° C for 10 hours. After filtration, the resulting product was washed with methanol and then with water, and was treated with 720 parts each of 1% aqueous hydrochloric acid solution and 1% aqueous sodium hydroxide solution both at 95° C for one hour. The product was washed with water and dried to obtain 27.9 parts of the blue-colored cobalt-phthalocyanine pigment.

EXAMPLE 79

To 120 parts of propanol were added with stirring 32 parts of phthalodinitrile, 12.7 parts of molybdenum chloride, 1.5 part of ammonium nitrate, 5.0 parts of triethylamine, 15.0 parts of sodium carbonate and 0.5 parts of sodium peroxide. The reaction was carried out by stirring the mixture at a temperature in the range of 25° to 30° C for one hour and then in the range of 60° to 65° C for 15 hours. After filtration, the resulting product was washed with methanol and then with water, and was treated with 720 parts each of 1% aqueous hydrochloric acid solution and 1% aqueous sodium hydroxide solution both at 95° C for one hour. The product was washed with water and dried to obtain 22.8 parts of the blue-colored molybdenum-phthalocyanine pigment.

EXAMPLE 80

To 150 parts of polyethylene glycol were added with stirring 32 parts of phthalodinitrile, 18.5 parts of zinc sulfate, 1.0 part of ammonium sulfate, and 5.5 parts of sodium peroxide. The reaction was carried out by stirring the mixture at a temperature in the range of 25° to 30° C for one hour and then in the range of 75° to 80° C for 10 hours. After filtration, the resulting product was washed with methanol and then with water, and was treated with 720 parts each of 1% aqueous hydrochloric acid solution and 1% sodium hydroxide solution both at 95° C for one hour. The product was washed with water and dried to obtain 23.3 parts of the bluish green-colored zinc-phthalocyanine pigment.

EXAMPLE 81

To a mixture of 50 parts of benzene and 120 parts of methanol were added with stirring 16 parts of phthalodinitrile, 20.3 parts of monochloro-phthalodinitrile, 2.0 parts of copper powder, 3.1 parts of cuprous chloride, 2.5 parts of ammonium chloride, 5.0 parts of sodium peroxide, and 2.0 parts of ethylene diamine. The reaction was carried out by stirring the mixture at a temperature in the range of 25° to 30° C for one hour and then in the range of 65° to 70° C for 10 hours. After filtration, the resulting product was washed with methanol and then with water, and was treated with 720 parts each of 1% aqueous hydrochloric acid solution and 1% aqueous sodium hydroxide solution both at 95° C for one hour. The product was washed with water and dried to obtain 29.5 parts of the blue-colored dichloro-copper-phthalocyanine pigment.

EXAMPLE 82

To a mixture of 30 parts of phenol and 120 parts of methanol were added with stirring 16 parts of phthalodinitrile, 33.2 parts of tetrachloro-phthalodinitrile, 8.4 parts of cupric chloride, 0.5 part of ammonium acetate, 2.0 parts of pyridine, and 5.5 parts of sodium peroxide. The reaction was carried out by stirring the mixture at a temperature in the range of 25° to 30° C for one hour and then in the range of 65° to 70° C for 10 hours. After filtration, the resulting product was washed with methanol and then with water, and was treated with 720 parts each of 1% aqueous hydrochloric acid solution and 1% sodium hydroxide both at 95° C for one hour. The product was washed with water and dried to obtain 33.3 parts of the bluish green-colored octachloro-copper-phthalocyanine pigment.

EXAMPLE 83

To a mixture of 50 parts of phenol and 100 parts of ethanol were added with stirring 16 parts of phthalodinitrile 35.7 parts of dibromo-phthalodinitrile, 6.2 parts of cuprous chloride, 3.0 parts of ammonium nitrate, and 8.5 parts of potassium hydroxide. The reaction was carried out by stirring the mixture at a temperature in the range of 25° to 30° C for one hour and then in the range of 70° to 75° C for 10 hours. After filtration, the resulting product was washed with methanol and then with water, and was treated with 720 parts each of 1% aqueous hydrochloric acid solution and 1% sodium hydroxide solution both at 95° C for one hour. The product was washed with water and dried to obtain 37.9 parts of the bluish green-colored tetrabromo-copper-phthalocyanine pigment.

EXAMPLE 84

To a mixture of 100 parts of methanol and 100 parts of ethylene diamine were added with stirring 16 parts of phthalodinitrile, 31.8 parts of moniodo-phthalodinitrile, 10.0 parts of copper sulfate, 2.5 parts of ammonium chloride, and 7.2 parts of sodium hydroxide. The reaction was carried out by stirring the mixture at a temperature in the range of 25° to 30° C for one hour and then in the range of 70° to 75° C for 10 hours. After filtration, the resulting product was washed with methanol and then with water, and was treated with 720 parts each of 1% aqueous hydrochloric acid solution and 1% aqueous sodium hydroxide solution both at 95°C for one hour. The product was washed with water and dried to obtain 36.6 parts of the bluish green-colored diiodo-copper-phthalocyanine pigment.

EXAMPLE 85.

To 180 parts of phenol were added with stirring 16 parts of phthalodinitrile, 24.6 parts of dichlorophthalodinitrile, 15.1 parts of cupric nitrate, 2.5 parts of ammonium chloride, and 7.1 parts of sodium hydroxide. The reaction was carried out by stirring the mixture at a temperature in the range of 50° to 60° C for one hour and then in the range of 75° to 80° C for 10 hours. After filtration, the resulting product was washed with methanol and then with water, and was treated with 720 parts each of 1% aqueous hydrochloric a solution and 1% aqueous sodium hydroxide solution both at 95° C for one hour. The product was washed with water and dried to obtain 37.0 parts of the bluish green-colored tetrachloro-copper-phthalocyanine pigment.

EXAMPLE 86.

To a mixture of 50 parts of benzene and 100 parts of phenol were added with stirring 40.6 parts of monochloro-phthalodinitrile, 6.8 parts of cupric chloride, 0.5 part of ammonium acetate, 5.0 parts of diethylamine, 4.5 parts of sodium carbonate and 0.5 parts of sodium peroxide. The reaction was carried out by stirring the mixture at a temperature in the range of 25° to 30°C for one hour and then in the range of 80° to 85°C for 10 hours. After filtration, the resulting product was washed with methanol and then with water, and was treated with 720 parts each of 1% aqueous hydrochloric acid solution and 1% aqueous sodium hydroxide solution both at 95° C for one hour. The product was washed with water and dired to obtain 32.5 parts of the green-colored tetrachloro-copper-phthalocyanine pigment.

EXAMPLE 88.

To a mixture of 150 parts of methanol and 180 parts of ethanol were added with stirring 71.5 parts of dibromo-phthalodinitrile, 10.9 parts of copper sulfate, 2.5 parts of ammonium chloride, 2.0 parts of pyridine, and 7.5 parts of potassium hydroxide. The reaction was carried out by stirring the mixture at a temperature in the range of 25° to 30°C for one hour and then under reflux for 15 hours. After filtration, the resulting product was washed with methanol and then with water, and was treated with 720 parts each of 1% aqueous hydrochloric acid solution and 1% aqueous sodium hydroxide solution at 95°C for one hour. The product was washed with water and dried to obtain 52.6 parts of the green-colored octabromo-copper-phthalocyanine pigment.

EXAMPLE 89.

To 260 parts of phenol were added 63.5 parts of monoiodophthalodinitrile, 6.2 parts of cuprous chloride, 3.0 parts of ammonium nitrate, 2.0 parts of aniline, and 3.5 parts of sodium peroxide. The reaction was carried out by stirring the mixture at a temperature in the range of 50° to 60°C for one hour and then in the range of 80° to 85°C for 15 hours. After filtration, the resulting product was washed with methanol and then with water, and was treated with 720 parts each of 1% aqueous hydrochloric acid solution and 1% aqueous sodium hydroxide solution both at 95°C for one hour. The product was washed with water and dried to obtain 48.0 parts of the green-colored tetraiodo-copper-phthalocyanine pigment.

EXAMPLE 90.

To a mixture of 150 parts of phenol and 100 parts of ethanol were added with stirring 66.5 parts of tetrachloro-phthalodinitrile, 6.8 parts of cuprous chloride, 4.0 parts of ammonium citrate, 1.0 part of ammonium chloride, and 4.5 parts of sodium hydroxide. The reaction was carried out by stirring the mixture at a temperature in the range of 25° to 30°C for one hour and then under reflux for 15 hours. After filtration, the resulting product was washed with methanol and then with water, and was treated with 720 parts each of 1% aqueous hydrochloric acid solution and 1% sodium hydroxide solution both at 95°C for one hour. The product was washed with water and dried to obtain 50.5 parts of the green-colored hexadeca-chloro-copper-phthalocyanine pigment.

EXAMPLE 91.

To a solvent mixture of 75 parts of methanol and 25 parts of xylol were added with stirring 32 parts of phthalodinitrile, 6.8 parts of cuprous chloride, and 3.2 parts of sodium hydroxide and 20 parts of dodecylbenzene sulfonate. The reaction was carried out by stirring the mixture at a temperature in the range of 25° to 30°C for 5 hours and then under reflux for 15 hours. After filtration, the resulting product was washed with methanol and then with water, and was treated with 720 parts each of 1% aqueous hydrochloric acid solution and 1% sodium hydroxide solution both at 95°C for one hour. The product was washed with water and dried to obtain 24.8 parts of the copper-phthalocyanine pigment.

The product has a well known β-type crystal form which shows peaks at the X-ray diffraction angles of 2θ° (CuK α /Ni), of 6.8, 7.2, 9.9, 15.6, 16.0, 24.0, 24.8, 26.6, and 27.4.

EXAMPLE 92.

To a solvent mixture of 150 parts of phenol and 50 parts of nitrobenzene were added with stirring 32 parts of phthalodinitrile, 10.0 parts of copper sulfate, 10.0 parts of potassium hydroxide, and 40 parts of ethylene glycol. The reaction was carried out by stirring the mixture at a temperature in the range of 25° to 30°C for 3 hours and then in the range of 70° to 75°C for 10 hours. After filtration, the resulting product was treated in the similar manner as in Example 91 to obtain 26.5 parts of the copper-phthalocyanine pigment.

The product has a well known α-type crystal form which shows peaks at the X-ray diffraction angles of 2θ° (CuK α /Ni), of 6.9, 9.0, 10.4, 12.4, 18.0, 18.4, 21.2, 23.6, 26.0, 27.9, and 30.3.

EXAMPLE 93.

To a solvent mixture of 15 parts of methanol and 75 parts of chlorobenzene were added with stirring 32 parts of phthalodinitrile, 8.4 parts of cupric chloride, 5.7 parts of sodium hydroxide and 2.0 parts of dodecylbenzene sulfonate. The reaction was carried out by stirring the mixture at 70°C for 10 hours. After filtration, the resulting product was treated in the similar manner as in Example 91 to obtain 23.4 parts of the copper-phthalocyanine pigment.

The X-ray analysis indicates that the product shows the same X-ray diffraction pattern as the copper-phthalocyanine pigment having well known α-type crystal form.

EXAMPLE 94.

To a solvent mixture of 100 parts of butanol, 10 parts of phenol, 20 parts of trichlorobenzene and 20 parts of ethyleneglycol were added with stirring 32 parts of phthalodinitrile, 12.5 parts of cupric acetate, 10 parts of sodium hydroxide, and 6 parts of urea. The reaction was carried out by stirring the mixture at a temperature in the range of 25° to 30°C for 3 hours and then in the range of 75° to 80°C for 10 hours. After filtration, the resulting product was repeatedly washed with methanol and then with water, and dried to obtain 25.6 parts of the copper-phthalocyanine pigment.

The X-ray analysis indicates that the product shows the same X-ray diffraction pattern as the copper-phthalocyanine pigment having well known β -type crystal form.

EXAMPLE 95.

To a solvent mixture of 80 parts of methanol, 20 parts of diethylene glycol ehtyl ether and 60 parts of benzene were added with stirring 32 parts of phthalodinitrile, 6.8 parts of cuprous chloride, 6 parts of sodium hydroxide, and 2.5 parts of ethanolamine. The reaction was carried out by stirring the mixture at a temperature in the range of 65° to 70°C for 10 hours. After filtration, the resulting product was treated in the similar manner as in Example 91 to obtain 20.7 parts of the copper-phthalocyanine pigment.

The X-ray analysis indicates that the product is a mixture of the phthalocyanine pigments having well known α -type and β -type crystal forms.

EXAMPLE 96.

To 150 parts of methanol were added with stirring 32 parts of phthalodinitrile and 6.8 parts of cuprous chloride. The reaction was carried out by stirring the mixture at room temperature and, after 4.5 parts of sodium hydroxide and 1 part of pyridine were added incrementally, the mixture was further stirred under reflux for 10 hours. Then, 24 parts of sulfuric acid was gradually added dropwise to the mixture, which was stirred for 1 hour and then under reflux for another one hour. After filtration and water-washing, the resulting product was dispersed into 640 parts of 0.5% aqueous sodium hydroxide solution, and stirred at 95°C for half an hour. After filtration, the product was washed with water and dried to obtain 28.0 parts of the copper-phthalocyanine pigment. The product shows the same crystal form as the well known β -type copper-phthalocyanine pigment. The pigment has a clear color tone, strong tinting power, and very good dispersing property.

EXAMPLE 97.

To 150 parts of methanol were added with stirring 32 parts of phthalodinitrile and 6.8 parts of cuprous chloride, and the mixture was stirred for one hour. After 5 parts of sodium hydroxide and a part of pyridine were added to the mixture, the reaction was further continued by stirring the mixture under reflux for 10 hours. Then, 35 parts of sulfuric acid was gradually added dropwise, and the mixture was again stirred for one hour and then under reflux for another one hour. After filtration, the product was dispersed into 640 parts of 0.5% aqueous sodium hydroxide solution and stirred for half an hour at 95° C. After filtration, the product was washed with water and dried to obtain 28.0 parts of the copper-phthalocyanine pigment. The product shows the same crystal form as the well known β-type copper-phthalocyanine pigment. The pigment has a clear color tone with slightly red, compared with the pigment in Example 96, strong tinting power, and very good dispersing property.

EXAMPLE 98

To 150 parts of ethanol were added with stirring 32 parts of phthalodinitrile, 8.4 parts of nickel chloride. Then, 6.0 parts of sodium hydroxide and 2 parts of triethanolamine were gradually added to the mixture. The reaction was carried out by stirring the mixture at a temperature in the range of 25° to 30° C for 5 hours and then under reflux for 10 hours. 10 parts of 98% sulfuric acid was then added dropwise, and the mixture was stirred under reflux for 2 hours. After filtration and water-washing, the product was dispersed into 640 parts of 1% aqueous sodium carbonate solution and the mixture was stirred at 95°C for one hour. The product was washed with water and dried to obtain 27.2 parts of nickel-phthalocyanine pigment. The product shows the same crystal form as the well known β -type nickel-phthalocyanine pigment. The pigment has a clear color tone, strong tinting power, and very good dispersing property.

EXAMPLE 99.

To 100 parts of methanol were added with stirring 32 parts of phthalodinitrile and 6.2 parts of cuprous chloride, and the mixture was stirred for one hour. After 5 parts of sodium hydroxide was added, the reaction was continued by stirring the mixture for 10 hours under reflux. Then, 60 parts of 98% sulfuric acid was gradually added dropwise, and the mixture was again stirred for one hour and then under reflux for half an hour. After filtration and water-washing, the product was dispersed into 640 parts of 1% aqueous sodium hyroxide solution, and the mixture was stirred at 80°C for one hour. After filtration, the product was washed with water and dried to obtain 28.0 parts of the copper-phthalocyanine pigment. The product shows the same crystal form as the well known β -type copper-phthalocyanine pigment. The pigment has a clear color tone with slightly red compared with the pigment in Examples 96 and 97, strong tinting power, and very good dispersing property.

EXAMPLE 100.

To 100 parts of methanol were added with stirring 32 parts of phthalodinitrile and 6.2 parts of cuprous chloride, and the mixture was stirred for 1 hour. After 5 parts of sodium hydroxide was gradually added, the reaction was continued by stirring the mixture under reflux for 10 hours. Then, 141 parts of 98% sulfuric acid was slowly added dropwise. The mixture was again stirred for one hour and the under reflux for half an hour. After filtration and water-washing, the product was dispersed into 640 parts of 1% aqueous potassium hydroxide solution, and the mixture was stirred at 60° C for one hour. After filtration, the product was washed with water and dired to obtain 28.0 parts of the copper-phthalocyanine pigment. The product is a mixture of phthalocyanine pigments having well known β -type and γ -type crystal forms. The pigment has a clear color tone, strong tinting power, and very good dispersing property.

EXAMPLE 101.

To 100 parts of methanol were added with stirring 32 parts of phthalodinitrile, and 8.4 parts of cupric chloride, and the mixture was stirred for one hour. After 7 parts of potassium hydroxide was gradually added, the reaction was continued by stirring the mixture at a temperature of 40° C for one hour and then under reflux for 10 hours. Then, 100 parts of 98% sulfuric acid was slowly added dropwise, and the mixture was stirred for one hour and under reflux for 6.0 hours. After filtration and water-washing, the resulting product was dispersed into 640 parts of 1% aqueous sodium hydroxide solution, and the mixture was stirred at 80° C for one hour. The product was filtered, washed with water, and dried to obtain 28.0 parts of the copper-phthalocyanine pigment. The product shows the same crystal form as the well known $\gamma$ -type copper-phthalocyanine pigment. The pigment has a clear color tone, strong tinting power, and very good dispersing property.

EXAMPLE 102.

To 100 parts of ethanol were added with stirring 32 parts of phthalodinitrile and 8.4 parts of cupric chloride, and the mixture was stirred for one hour. After 8 parts of sodium carbonate and 2 parts of sodium hydroxide were gradually added, the reaction was continued by stirring the mixture at a temperature of 40° C for one hour and then under reflux for 10 hours. Then, 100 parts of 98% sulfuric acid was slowly added dropwise, and the mixture was stirred for one hour and under reflux for half an hour. After filtration and water-washing, the resulting product was dispersed into 640 parts of 1% aqueous sodium hydroxide solution, and the mixture was stirred at 80° C for one hour. The product was filtered, washed with water, and dired to obtain 27.0 parts of the copper-phthalocyanine pigment. The product shows the same crystal form as the well known $\gamma$ -type copper-phthalocyanine pigment. The pigment has a clear color tone, strong tinting power, and very good dispersing property.

EXAMPLE 103.

To 120 parts of methanol were added with stirring 32 parts of phthalodinitrile, 6.2 parts of cuprous chloride, and 5 parts of sodium hydroxide. The reaction was carried out by stirring the mixture at a temperature of 30° C for 25 hours. Then 40 parts of hydrogen chloride was slowly introduced, and the mixture was further stirred for one hour and then under reflux for 10 hours. After filtration and water-washing, the resulting product was dispersed into 640 parts of 0.5% aqueous sodium hydroxide solution, and the mixture was stirred at 95° C for half an hour. The product was filtered, washed with water, and dried to obtain 28.0 parts of the copper-phthalocyanine pigment. The product shows the same crystal form as the well known $\beta$ -type copper-phthalocyanine pigment. The pigment has a clear color tone, strong tinting power, and very good dispersing property.

EXAMPLE 104.

To 180 parts of polyethylene glycol were added with stirring 32 parts of phthalodinitrile, 8.2 parts of nickel chloride, 2.0 parts of urea, and 5.5 parts of sodium hydroxide. The reaction was carried out by stirring the mixture for one hour, at a temperature in the range of 25° to 30° C for one hour, and then in the range of 70° to 75° C for 10 hours. Then, the reaction mixture was cooled to 50° C, and 20 parts of phosphoric acid was slowly added dropwise. The mixture was further stirred for one hour and at 70° C for 2 hours. After filtration and water-washing, the resulting product was then dispersed into 640 parts of 0.5% aqueous sodium hydroxide solution, and the mixture was stirred at 95° C for half an hour. The product was filtered, washed with water, and dried to obtain 27.2 parts of the nickel-phthalocyanine pigment. The product shows the same crystal form as the well known $\beta$ -type nickel-phthalocyanine pigment. The pigment has a clear color tone, strong tinting power, and very good dispersing property.

EXAMPLE 105.

To 120 parts of methanol were added with stirring 32 parts of phthalodinitrile, 6.2 parts of cuprous chloride, and 5.0 parts of sodium hydroxide, and the mixture was stirred for half an hour. The reaction was further continued by stirring the mixture at a temperature in the range of 25° to 30° C for one hour and then under reflux for 10 hours. To the mixture 98 parts of acetic acid was slowly added dropwise, and the mixture was again stirred for one hour and under reflux for 2 hours. After filtration and water-washing, the resulting product was dispersed into 640 parts of 0.5% aqueous sodium hydroxide solution, and the mixtue was stirred at 80° C for the hour. The product was filtered, washed with water, and dried to obtain 28.1 parts of the copper-phthalodicyanine pigment. The product shows the same crystal form as the well known $\beta$ -type copper-phthalocyanine pigment. The pigment has a clear color tone, strong tinting power, and very good dispersing property.

EXAMPLE 106.

To 180 parts of methanol were added with stirring 32 parts of phthalodinitrile, and 18.2 parts of nickel nitrate. The mixture was stirred for one hour. 2 parts of triethanolamine was slowly added to the mixture, and then 8.5 parts of calcium hydroxide was added. The reaction was continued at a temperature in the range of 25° to 30° C for one hour and then in the range of 50° to 60° C for 15 hours. The mixtures was cooled to 50°C, and 10 parts of anhydrous phosphoric acid was slowly added. The mixture was stirred for half an hour and at 60° C for 2 hours. After filtration and water-washing, the resulting product was then dispersed into 640 parts of 0.5% aqueous sodium carbonate solution, and the mixture was stirred at 95° C for half an hour. The product was filtered, washed with water, and dired to obtain 27.7 parts of the nickel-phthalocyanine pigment. The product shows the same crystal form as the well known $\beta$ -type nickel-phthalocyanine pigment. The pigment has a clear color tone, strong tinting power, and very good dispersing property.

EXAMPLE 107.

To 150 parts of buthanol were added with stirring 32 parts of phthalodinitrile and 18.2 parts of cobalt nitrate. The mixture was stirred for half an hour, and 2.5 parts of triethanolamine and 5.2 parts of sodium hydroxide were slowly added. The reaction was carried out by stirring the mixture at a temperature in the range of 25° to 30° C for 5 hours and then in the range of 50° to 60°C for 10 hours. Then, 15 parts of 35% hydrochloric acid was slowly added dropwise, and the mixture was further stirred for half an hour and at 60° C for one hour. After filtration and water-washing the resulting product was then dispersed into 640 parts of 0.5% aqueous sodium carbonate solution, and the mixture was sitrred at 95° C for one hour. The product was filtered, washed with water, and dried to obtain 26.0 parts of the cobalt-phthalocyanine pigment. The product shows the same crystal form as the well known $\beta$-type coblat-phthalocyanine pigment. The pigment has a clear color tone, strong tinting power, and very good dispersing property.

EXAMPLE 108.

To 150 parts of methanol were added with stirring 32 parts of phthalodinitrile and 6.2 parts of cuprous chloride. Then 7 parts of sodium hydroxide and 1 part of pyridine were slowly added to the mixture, and 2 parts of a sodium alkyl aryl sulfonate was added. The reaction was carried out by stirring the mixture for one hour and then under reflux for 10 hours. The mixture was cooled to 60° C, and after 20 parts of 98% sulfuric acid was slowly added dropwise, the mixture was stirred under reflux for one hour. Then, the reaction mixture was neutralized with an alkaline material such as ammonia, and filtered to remove impurity substances, if any, the mixture was washed with methanol and 100 parts of a sodium alkyl-sulfonate was added to the wahsed material with stirring. Methanol was distilled off under a reduced pressure to obtain a composition comprising the pigment and the surface active agent.

The product, when added to water with stirring, is readily dispersed without deposition of pigment particles so that it is suitable for use in pigment printing of textile.

EXMAPLE 109.

To 150 parts of methanol were added with stirring 32 parts of phthalodinitrile and 8.3 parts of cobalt chloride, and then 7.0 parts of sodium hydroxide and 1 part of pyridine were slowly added to the mixture. The reaction was carried out by stirring the mixture for 5 hours and then under reflux for 10 hours. The mixture was cooled to 40° C, and 20 parts of 98% sulfuric acid was slowly added dropwise, and 3 parts of dodecyl-sulfosuccinate was added to the mixture, which was then stirred under refulx for one hour. Thereafter, in the similar manner as in Example 108, the reaction mixture was treated. and 100 parts of polyoxyethylene lauryl ether was added. Methanol was distilled off under a reduced pressure to obtain a composition comprising the pigment and the surface active agent. The product, when impregnated with water to swell the product, and added to aqueous dispersion of acryl resin. synthetic rubber. and the like. is especially suitable for pigment printing of various colorless materials such as. for example. fibers.

EXAMPLE 110.

To 150 parts of ethanol were added with stirring 32 parts of phthalodinitrile and 6.8 parts of cuprous chloride. Then, 5 parts of sodium hydroxide, 5 parts of sodium carbonate, and 1 part of pyridine were slowly added to the mixture. The reaction was carried out by stirring the mixture for 5 hours and then under reflux for 10 hours. The reaction mixture was cooled to 60° C, and 20 parts of sulfuric acid was slowly added dropwise to the mixture, which was then stirred under reflux for 3 hours, and was treated in the similar manner as in Example 108. Then, 10 parts of a polyoxy ethylene alkyl phenol was added, and ethanol was distilled off to obtain a composition comprising the pigment and the surface active agent. When the product is added to viscose spinning solutions, suitably colored spinning solutions can be obtained.

EXAMPLE 111.

To 150 parts of methanol were added with stirring 32 parts of phthalodinitrile arid 8.4 parts of cobalt chloride. After 10 parts of sodium hydroxide and 2 parts of triethanolamine were slowly added to the mixture, 2 parts of a polyoxyethylene alkyl phenol was added. The reaction was carried out by stirring the mixture for 5 hours and then under reflux for 15 hours. The mixture was then cooled to 40° C. After 20 parts of 98% sulfuric acid was slowly added dropwise to the mixture, which was stirred under reflux for an hour. Thereafter, the reaction mixture was treated in the similar manner as in Example 108, and then 3 parts of sorbitan diester and 2 parts of trioxystearinglyceride were added to the mixture and distilled under a reduced pressure to remove methanol, and dried to obtain a composition comprising the pigment and the surface active agent.

The product, when added to natural rubber, together with other additives, and mixed in a mixing roll, provides higher resistance to deterioration than the conventional pigment, and is suitable for coloring of rubber.

EXAMPLE 112.

To 150 parts of ethanol were added with stirring 32 parts of phthalodinitrile and 8.4 parts of cupric chloride. Then, 5.8 parts of sodium carbonate and 2 parts of sodium hydroxide were slowly added to the mixture. The reaction was carried out by stirring the mixture for 5 hours and then under reflux for 10 hours. The reaction mixture was cooled to 60° C. After 15 parts of 98% sulfuric acid was slowly added dropwise to the mixture, which was then stirred under reflux for half an hour. Thereafter, the reaction mixture was treated in the similar manner as in Example 108, and then 5 parts of a polyoxyethylenealkylphenol ether was added to the mixture and distilled under a reduced pressure to remove ethanol and obtain a composition comprising the pigment and the surface active agent.

Since the product has dispersability in oil vehicles, it is suitably used in lacquers, printing of fibers, plastics, rubber and off-set-printing, when dispersed into alcohol, benzene, toluene, ketone, and the like.

EXAMPLE 113.

To 100 parts of methanol were added with stirring 32 parts of phthalodinitrile and 8.4 parts of cupric chloride. The mixture was stirred for 3 hours. Then, 7.5 parts of potassium hydroxide was slowly added, and the reaction was continued by stirring the mixture at a temperature of 40° C for one hour and then under reflux for 10 hours. After 100 parts of 98% sulfuric acid was slowly added dropwise, the mixture was further stirred for one hour under reflux for half an hour. After filtration, the resulting product was washed with water and dried to obtain 37.6 parts of the stable coppephthalocyanine bi-sulfate.

EXAMPLE 114.

To 100 parts of ethanol were added with stirring 32 parts of phthalodinitrile and 8.4 parts of cupric chloride. The mixture was stirred for one hour. Then, 8 parts of sodium carbonate and 4 parts of sodium hydroxide were slowly added, and the reaction was continued by stirring the mixture at a temperature of 40° C for 3 hours and then under reflux for 10 hours. After 82 parts of 98% sulfuric acid was slowly added dropwise, the mixture was further stirred for one hour and then under reflux for half a hour. After filtration, the resulting product was washed with water and dried to obtain 36.2 parts of the stable copper-phthalocyanine bi-sulfate.

EXAMPLE 115.

To 100 parts of ethanol were added with stirring 32 parts of phthalodinitrile and 8.4 parts of nickel chloride. The mixture was stirred for one hour. Then 5.8 parts of sodium hydroxide and 2 parts of triethanolamine were slowly added to the mixture, and the reaction was continued by stirring the mixture at a temperature of 40° C for 5 hours and then under reflux for 15 hours. After 125 parts of 98% sulfuric acid was slowly added dropwise, the mixture was further stirred for one hour and under reflux for half an hour. After filtration, the resulting product was wahsed with water and dried to obtain 35.0 parts of the nickel-phthalocyanine bi-sulfate.

EXAMPLE 116

To 120 parts of methanol were added with stirring 32 parts of phthalodinitrile and 8.3 parts of cobalt chloride. The mixture was stirred for half an hour. Then 8 parts of potassium hydroxide was slowly added to the mixture, and the reaction was continued by stirring the mixture at a temperature of 40° C for 2 hours and then under reflux for 10 hours. After 115 parts of 98% sulfuric acid was slowly added dropwise, the mixture was further stirred for one hour and under reflux for half an hour. After filtration, the resulting product was washed with water and dired to obtain 35.2 parts of the cobalt phthalocyanine bi-sulfate.

EXAMPLE 117

To 120 parts of methanol were added with stirring 43 parts of carboxylic acid phthalodinitrile, 6.8 parts of cuprous chloride, and 3.4 parts of sodium hydroxide. The mixture was stirred at room temperature for 5 hours, and at the reflux temperature of methanol for additional 12 hours. The resulting product was recovered by filtration and washed with water and dried to obtain 28.2 parts of the phthalocyanin.

We claim:

1. A method for producing a copper phthalocyanine pigment which comprises subjecting an o-dinitrile type compound having a formula of

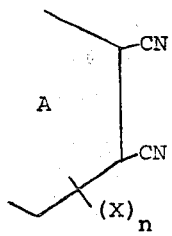

wherein A is an aryl radical or pyridinyl radical, X is hydrogen or halogen atom, nitro, amino, sulfonic acid, carboxylic acid, alkyl, methoxy or ethoxy radical, and $n$ is an integer of 1–4 when X is hydrogen or halogen atom, and $n$ is an integer of 1–2 when X is nitro, amino, sulfonic acid, carboxylic acid, alkyl, methoxy or ethoxy radical and 0.25 mol or more per mole of o-dinitrile type compound of a metallic substance capable of forming a central nucleus of the phthalocyamine pigment selected from the group consisting of copper powder, cuprous oxide, cupric oxide, cuprous chloride, cupric chloride, couprous bromide, cupric bromide, copper sulfate, copper nitrate, copper phosphide, and copper acetate, to condensation reaction at a temperature ranging from 100°C to room temperature in the presence of 0.1 – 2 mols per mol of the o-dinitrile type compound of an alkaline substance selected from the group consisting of hydroxide, oxide, peroxide, and carbonate of alkali metal and of alkaline earth metal and a hydrophilic organic solvent having hydroxy radical selected from the group consisting of methanol, ethanol, propanol, isopropanol, butanol, isobutanol, secondary butanol, ethylene glycol, propylene glycol, polyethylene glycol, methyl cellosolve, ethyl cellosolve, diethylene glycol ethyl ether, phenol, o, -m-, and p-cresol.

2. A method for producing a copper phthalocyanine pigment which comprises subjecting an odinitrile type compound having formula of

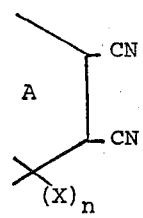

wherein A is an aryl radical or pyridinyl radical, X is hydrogen or halogen atom, nitro, amino, sulfonic acid, carboxylic acid, alkyl, methoxy, or ethoxy radical, and $n$ is an integer of 1–4 when X is hydrogen or halogen atom, and X is an integer of 1–2 when $n$ is nitro, amino sulfonic acid, carboxylic acid, alkyl, methoxy or ethoxy radical and a metallic substance capable of forming a central nucleus of the copper phthalocyanine pigment to condenstation reaction at a temperature ranging from 100°C to room temperature in the presence of an alkaline substance selected from the group consisting of hydroxide, oxide, peroxide, and carbonate of alkali metal and of alkaline earth metal a hydrophilic organic solvent having hydroxy radical selected from the group consisting of methanol, ethanol, propanol, isopropanol, butanol, isobutanol, secondary butanol, ethylene glycol, propylene glycol, polyethylene glycol, methyl cellosolve, ethyl cellosolve, diethylene glycol ethyl ether, phenol, o-, m-, and p-cresol.

3. A method of claim 2 wherein the odinitrile type compound is a member selected from the group consisting of phthalodinitrile, 3,4-dinitrile diphenyl, 1,2-dinitrile naphthalene, 2,3-dinitrile napthalene, 2,3-dinitrile anthracene, 2,3-dinitrile phenanthrene, mono- , di-, tri or tetra-chlorophthalodinitrile, mono-, di-, tri- or tetra-bromophthalodinitrile, mono-, di-, tri- or tetra-iodophthalodinitrile, sulfonic acid-substituted phthalodinitrile, carboxylic acid substituted pthalodinitrile, nitro-substituted phthalodinitrile, amino-substituted phthalodinitrile, alkyl-substituted phthalodinitrile, methoxy phthalodinitrile, and ethoxy phthalodinitrile.

4. A method of claim 2 wherein the metallic substance capable of forming a central nucleus of the phthalocyanine pigment is a member selected from the group consisting of copper powder, cuprous oxide, cupric oxide, cuprous chloride, cupric chloride, cuprous bromide, cupric bromide, copper sulfate, copper nitrate, copper phosphide, and copper acetate.

5. A method of claim 2 wherein the alkaline substance is a member selected from the group consisting of lithium oxide, lithium peroxide, lithium hyroxide, lithium carbonate, sodium oxide, sodium peroxide, sodium hydroxide, sodium carbonate, potassium oxide, potassium peroxide, potassium hyddroxide, potassium carbonate, beryllium oxide, beryllium hydroxide, magnesium oxide, magnesium hydroxide, clacium oxide, calcium peroxide, calcium hydroxide, strontium oxide, strontium peroxide, strontium hydroxide, barium oxide, barium peroxide and barium hydroxide.

6. The method of claim 2 wherein 0.25 mol or more per mol of o-dinitrile type compound of said metallic substance are employed; and wherein 0.1-2 mols of said alkaline substance per mol of said o-dinitrile compound are employed.

7. The method of claim 2 which is carried out in the presence of an ammonium salt selected from the group consisting of ammonium chloride, ammonium nitrate, ammonium sulfate, ammonium persulfate, ammonium orthophosphate, ammonium metaphosphate, ammonium pyrophosphate, ammonium carbonate, ammonium bicarbonate, ammonium formate, ammonium acetate, ammonium propionate, ammonium citrate and ammonium oxalate.

8. The method of claim 7 wherein the reaction is carried out in the presennce of 0.1-2 mols per mole of the o-dinitrile type compound of said alkaline substance; and 0.1–10% by weight of the o-dinitrile compound of said ammonium salt 9. The method of claim 2 wherein the reaction is carried out in the presence of a solvent mixture of said hydrophilic organic solvent having hydroxyl radical and a hydrophobic aromatic solvent selected from the group consisting of benzene, toluene, xylene, naphthalene, monochlorobenzene, dichlorobenzene, trichlorobenzene, chloronaphthalene, nitrobenzene, chloronitrobenzene and nitrotoluene.

10. The method of claim 2 which further comprises adding an acid to the reaction mixture, mixing the total mixture with stirring and removing the acid from the mixture.

11. The method of claim 2 wherein which further comprises adding an acid and a surfactant to the reaction mixture, mixing the total mixture with stirring and removing said hydrophilic organic solvent and acid form the total mixture.

12. The method of claim 2 which further comprises adding a sulfuric acid to the reaction mixture, mixing the total mixture with stirring and removing the excess sulfuric acid.

13. The method of claim 2 wherein the reaction is carried out at a temperature of about 70°C.

14. A method of claim 10 wherein the acid is a member selected from the group consisting of hydrochloric acid, nitric acid, sulfuric acid, phosphoric acid, acetic acid, propionic acid, citric acid, and oxalic acid.

15. A method of claim 10 wherein the metallic substance capable of forming a central nucleus of the phthalocyanine pigment is copper.

16. A method of claim 11 wherein the surfactant is a member selected from the group consisting of alkyl arylsulfonate, alkyl naphthalenesulfonate, alkyl sulfosuccinate, lignin sulfonate, sulfuric ester of aliphatic alcohol, sulfuric ester of castor oil, rosin soap, fatty acid ester or ether of polyoxyethylene, polyoxyethylene alky ether, sorbitane ester, mono higher fatty acid salt of sorbitane, polyoxyethylene alkylphenol or ether, alkyl amide of fatty acid, alkyl-triethyl ammonium chloride, alkyl pyridinium halide, fatty acid amine salt of alkyl benzimidazole and cyclohexylamine salt.

17. The method of claim 1 wherein the temperature is about 70° C.

* * * * *